(12) United States Patent
Zachary et al.

(10) Patent No.: US 9,429,018 B2
(45) Date of Patent: Aug. 30, 2016

(54) SYNERGISTIC ENERGY ECOSYSTEM

(75) Inventors: Jai Zachary, Summerland (CA); James Andrew Leskosek, Summerland (CA); Greg John Montie, Surrey (CA)

(73) Assignee: ElectroMotion Energy Corporation, Summerland, British Columbia (CA)

( * ) Notice: Subject to any disclaimer, the term of this patent is extended or adjusted under 35 U.S.C. 154(b) by 989 days.

(21) Appl. No.: 13/514,912

(22) PCT Filed: Dec. 8, 2010

(86) PCT No.: PCT/CA2010/001969
§ 371 (c)(1),
(2), (4) Date: Jun. 8, 2012

(87) PCT Pub. No.: WO2011/069263
PCT Pub. Date: Jun. 16, 2011

(65) Prior Publication Data
US 2013/0076033 A1    Mar. 28, 2013

Related U.S. Application Data

(60) Provisional application No. 61/267,609, filed on Dec. 8, 2009.

(51) Int. Cl.
*F01B 23/10* (2006.01)
*F24D 5/04* (2006.01)
(Continued)

(52) U.S. Cl.
CPC ............ *F01B 23/10* (2013.01); *F24D 5/04* (2013.01); *F24D 11/0214* (2013.01); *F24D 11/0285* (2013.01); *F24H 7/00* (2013.01); *F28D 20/0034* (2013.01); *F28D 20/0056* (2013.01); *F28D 20/026* (2013.01); *F24D 2200/19* (2013.01); *F24D 2200/26* (2013.01); *F24H 2240/06* (2013.01); *F24H 2240/10* (2013.01); *F28D 1/0472* (2013.01); *F28D 21/0003* (2013.01); *F28D 2020/0078* (2013.01); *F28D 2020/0082* (2013.01); *Y02B 10/70* (2013.01); *Y02B 30/126* (2013.01); *Y02B 30/52* (2013.01); *Y02E 20/14* (2013.01); *Y02E 60/142* (2013.01); *Y02E 60/145* (2013.01)

(58) Field of Classification Search
CPC .................................. F01B 23/10; F24D 5/04
USPC .............................................. 237/12.1; 290/2
See application file for complete search history.

(56) References Cited

U.S. PATENT DOCUMENTS 4,223,666 A * 9/1980 Wasserman ............ F24J 2/0444
126/400
4,226,214 A    10/1980 Palazzetti
(Continued)

FOREIGN PATENT DOCUMENTS

EP        0070545 A2 *  1/1983  ............... F02G 5/04

*Primary Examiner* — Avinash Savani
*Assistant Examiner* — Deepak Deean
(74) *Attorney, Agent, or Firm* — Antony C. Edwards

(57) ABSTRACT

Synergistic Energy Ecosystem using a co-generation system and method wherein waste energy from waste heat producers within an enclosure including an electric generator is reclaimed to supply heat to the cold end of a heat pump within the enclosure for optimized use in space heating a habitat and to the management of the distribution of electricity from the generator so as to supply electricity to the habitat and to neighboring habitats when efficient, cost-effective or required to do so by distribution policies managing the energy eco-system.

33 Claims, 13 Drawing Sheets

(51) Int. Cl.
*F24D 11/02* (2006.01)
*F24H 7/00* (2006.01)
*F28D 20/00* (2006.01)
*F28D 20/02* (2006.01)
F28D 1/047 (2006.01)
F28D 21/00 (2006.01)

(56) References Cited

U.S. PATENT DOCUMENTS

| | | | | |
|---|---|---|---|---|
| 4,412,391 | A | * | 11/1983 | Bolognino .............. D06F 58/20 122/20 B |
| 4,495,901 | A | * | 1/1985 | Nannini ................... F02B 63/04 123/195 C |
| 4,510,756 | A | | 4/1985 | Hise et al. |
| 5,535,944 | A | | 7/1996 | Knowles |
| 7,240,505 | B2 | * | 7/2007 | Kim ........................ F25B 13/00 62/238.7 |
| 7,275,382 | B2 | * | 10/2007 | Cho ........................ F25B 13/00 62/238.7 |
| 7,305,841 | B2 | * | 12/2007 | Ryu ........................ F25B 13/00 62/238.6 |
| 7,350,365 | B2 | * | 4/2008 | Kim ........................ F25B 27/02 62/115 |
| 7,377,107 | B2 | * | 5/2008 | Sugioka .................. F02G 1/055 60/517 |
| 2003/0075494 | A1 | * | 4/2003 | Miranda .................. C02F 1/04 210/243 |
| 2005/0284946 | A1 | * | 12/2005 | Komura .................. F24D 12/02 237/2 B |
| 2006/0123819 | A1 | * | 6/2006 | Choe ....................... F25B 25/02 62/238.3 |
| 2006/0123823 | A1 | * | 6/2006 | Ha ........................... F02G 5/00 62/238.7 |
| 2006/0150652 | A1 | * | 7/2006 | Choi ....................... F25B 13/00 62/238.6 |
| 2006/0242977 | A1 | * | 11/2006 | Cho ........................ F25B 13/00 62/238.7 |
| 2006/0283967 | A1 | * | 12/2006 | Cho ....................... F24F 3/1423 237/12.1 |
| 2007/0012058 | A1 | * | 1/2007 | Cho ........................ F25B 13/00 62/238.7 |
| 2007/0012418 | A1 | * | 1/2007 | Cho ........................ F25B 13/00 165/58 |
| 2007/0018009 | A1 | * | 1/2007 | Choi .................... F24F 11/0086 237/12 |
| 2008/0022707 | A1 | * | 1/2008 | Cho ........................ F25B 13/00 62/238.1 |
| 2008/0023962 | A1 | * | 1/2008 | Cho ................... B60H 1/00421 290/2 |
| 2008/0262857 | A1 | * | 10/2008 | Perera .................... G06Q 30/00 705/1.1 |

* cited by examiner

PERFORMANCE PREDICTIONS

Equipment:
- *Revolution - Includes a 10kW Generac, Heat Pump Frigidaire 042K, and a 24x48x12" Paraffin Wax thermal battery (0-65 C range)*
- *Application - Typical 2 story 2000sqft house, 11,004 BTU/Hr heat loss at -15C outside, 20 inside*

House Heating Operational Cases in Winter (-15C):
- Heat pump consumes 0.9 kW hr electricity to heat house
- Generator consumes $77/month NG to heat house, HP electricity free, to heat house

- CHARGING BATTERY – Total generator heat into cold thermal battery
    - 5 hr, 35 min charge time (generating NO electricity - idle)
    - 1 hr, 25 min charge time (generating 1.4 kW electricity for heat pump)
    - 25 min charge time (generating 9 kW electricity maximum)
    - $0.90 in Natural Gas to charge thermal battery
- DISCHARGING BATTERY – Heat pump & thermal battery ONLY (fully charged thermal battery)
    - 5 hrs, 24 minutes house remains at 20C then cools at a rate of 20C/hour
- HEAT CYCLE – house holding 0.5C temperature swing
    - 24s heating time warm air into house
    - 90s wait
- FORCING 5 MINUTE GENERATOR RUN TIME
    - 14 minute generator off time, heat pump pulls from battery Battery optimization:
- 24x48x12" good for 5 hour, 25min home heating under generator failure
- 12x12x12" good for 5 minute generator heat storage, 19 minutes before house begins to cool (Factor Safety 2)

*FIG.11a*

SYNERGISTIC ENERGY ECOSYSTEM

CROSS REFERENCE TO RELATED APPLICATION

This application claims priority from U.S. Provisional Patent Application No. 61/267,609 filed Dec. 8, 2009 entitled Synergistic Energy Ecosystem.

FIELD OF THE INVENTION

This invention relates to systems for optimizing the efficient production of energy, including heat and electricity, using a co-generation system and method wherein waste energy from waste heat producers within an enclosure including an electric generator is reclaimed to supply heat to the cold end of a heat pump within the enclosure for optimized use in space heating a habitat and to the management of the distribution of electricity from the generator so as to supply electricity to the habitat and to neighbouring habitats when efficient, cost-effective or required to do so by distribution policies managing the energy eco-system.

BACKGROUND OF THE INVENTION

As demand for electricity continues to increase and approaches maximum capacity, new demands being placed upon generation and utility grid distribution infrastructure, energy prices will escalate and rolling blackouts and grid failures will become more common occurrences. Historically, the basic method of electrical generation and distribution systems has not changed since the first generation facility and utility grid was established. Utilities have traditionally responded to increased demand by overbuilding their generation and distribution capabilities to alleviate failure of the system during peak demand, with the system being designed for one-way energy distribution from large, remote generation facilities to where the energy is demanded and consumed. Peak grid is the most significant problem the utility sector has with generating and distributing electrical energy to consumers because of the time of day the energy is demanded, the type of energy required and demanded, and from electrical and gas utilities at the demand site.

Adding to the challenges facing the utility sector is the inefficient and aging generation and distribution infrastructure which is becoming increasingly incapable of both meeting growing current demand and expanding to meet future demand. Such expansion will be difficult and expensive given strict environmental laws, inherent inefficiencies, significant capital expense, extended build out timeframes, and introduction of carbon emission taxes.

Over the years a myriad of technologies and products have been developed and offered as potential solutions to these many challenges with limited success. Efforts have focussed on the areas of: energy management systems to improve generation, distribution, and the control of the electricity; distributed generation and/or cogeneration systems at the demand site; and improving the efficiency of electrical, gas, and other energy devices to reduce consumption.

U.S. Pat. No. 7,085,660 describes a method and system for optimizing the performance of a generation and distribution system using historical data and short term load forecasts. U.S. Pat. No. 6,775,594 B1 describes a method of dispatching and ranking a plurality of electrical generation systems over a computer network and controlling them by a central monitoring and control system with the goal to reduce utility service brownouts and blackouts.

U.S. Pat. No. 6,583,521 discloses an energy management system for power generators located at or near a customer's premise dedicated to the needs of that consumer. U.S. Pat. No. 7,133,852 discloses an electricity generation equipment management system for onsite power generation supplied to the consumer and interaction with a service company for maintenance through a central management center. U.S. Pat. No. 6,757,591 describes a method and system for managing the generation and distribution of energy to a building.

A significant contributor to peak demand, emissions, and demand cycles is hot water consumption and the heating and cooling of homes and businesses. Applicant believes most heat, and hot water account for more than 70 percent of typical North American household energy usage. In the heating and cooling industry, micro combined heat power (MCHP) cogeneration systems commonly include an engine; a generator to generate electricity using a rotating force outputted from the engine; and a heat transfer means to supply waste or unused heat of the engine to a hydronic heat pump such as a water heater or an air conditioning device.

Historically, electricity generated from a generator is used to operate electrical devices such as electrical heaters, fans or lights in the event of a complete loss of electricity from Utility distribution grids after loss of electrical utility service, which is reactive, rather than proactive resulting in inefficiency at eliminating peak demand and utility failure.

Two common methods of releasing heat from the generator are hydronic coolant and a cooling fan to prevent overheating. The heat transfer means recovers waste heat of cooling water used to cool the engine or waste heat of exhaust gas discharged from the engine, and supplies the recovered waste heat to a water heater or an air conditioning device. However, such a conventional cogeneration system experiences problems of increased noise during operation of the cooling fan, inefficient capture and utilization of generator waste heat, and limited enhancement in the efficiency of the system, including insufficient electricity for the heating and cooling system to operate independent of electricity supplied by the utility grid when utility service fails.

There have been considerable research and development efforts in the prior art to develop an economically-viable cogeneration unit for the typical residential energy user with both power and thermal energy needs. Various attempts have been made to increase the efficiency of cogeneration systems.

U.S. Pat. No. 7,284,709 and U.S. Pat. No. 7,040,544 are prior art examples of cogeneration units that employ a water-cooled internal combustion engine in combination with an electrical generator and hydronic heat exchanger technology. The efficiency of such an engine generator combination depends to a great extent upon the amount of so-called waste heat which can be recovered from the engine exhaust and engine coolant for heating and cooling needs. In many instances, the engine-generator set is mounted in the open environment, that is, in the outside ambient air, on a concrete pad or similar platform and little to no effort is made to recover heat which is lost through radiation to the atmosphere. In fact, many designs rely on heat radiation for engine cooling. U.S. Pat. No. 7,174,727 and U.S. Pat. No. 4,380,909 are prior art examples of cogeneration units that employ a water-cooled internal combustion engine in combination with an electrical generator and outdoor heat exchanger.

In applicant's view, the prior art reflects that current systems are not efficient in cold weather climates. Air Source Heat Pump technology becomes less efficient as the temperature of the air decreases. There is less heat energy in the air, thereby requiring more electrical energy to extract heat from the air. In addition, air source heat pumps may have to engage a defrost cycle, temporarily halting heating of the building in order to create heat for its own use in order to thaw its components. U.S. Pat. No. 7,503,184 is an example of prior art that attempts to overcome these deficiencies.

U.S. Pat. No. 4,262,209 describes an engine and generator which are housed within a thermally-insulated enclosure to capture radiated heat, and also to attenuate the sound level of operation.

U.S. Pat. No. 4,495,901 describes a system in which intake air for the engine is circulated through the enclosure for preheating, which tends to capture some of the radiated heat. However, preheating the air results in a less dense fuel charge to the engine and undesirably reduces the rated horsepower of the engine and therefore may lower the electrical output.

Thermal storage heat systems are used in heat pumps in systems such as air conditioning in order to shift the loads which are applied to the system to achieve load levelling and avoid the need to provide a pump which is designed to meet the maximum load requirements when maximum load requirements are only required for a limited period of its day-to-day operation. In the prior art U.S. Pat. No. 5,355,688, U.S. Pat. No. 5,755,104, and U.S. Pat. No. 4,554,797, and U.S. Pat. No. 4,686,959 demonstrate this technique.

When the engine is enclosed in a thermally insulated enclosure, heat is radiated until the enclosure air reaches a temperature approximating that of the engine which is then dispersed without a thermal storage unit resulting in inefficiency of operation. Moreover, frequent engine start-ups and shut-downs significantly compound the reduction of efficiency of the system. The situation is not greatly improved if a circulating air fan is used to scavenge some of the heated air for use as engine intake air, as discussed earlier, and heat exchangers are not sufficiently efficient.

Society's energy consumption and emissions have become great concern to governments and individuals, with many efforts being made at all levels to monitor, reduce, and control these while balancing important economic and environmental drivers. These efforts include energy financial incentives and new emission taxation and credit systems to encourage people to seek more environmentally beneficial products and behaviour. U.S. Pat. No. 7,181,320, US Patent Application US 2007/0179683 and US Patent Application US 2006/0195334 are examples of prior art that provide methods for monitoring and managing emissions. U.S. Pat. No. 6,216,956 describes an indoor environmental condition control and energy management system for onsite control and reduction of energy costs and consumption. U.S. Pat. No. 5,528,507 and US Patent Application US 2006/0155423 describe systems that include grid-level monitoring with onsite management of energy at demand sites. Additionally, prior art provides for power management at the device level with the intent to reduce energy consumption and provide control devices. U.S. Pat. No. 5,270,505 provides for a remotely controlled switch/receptacle. US Patent Application US 2008/0221737 and US Patent Application US 2007/0136453 describe networked power management devices and systems for communication and energy control to an electrical device. In addition, U.S. Pat. No. 7,373,222 and Patent Applications US 2009/0018706 and US 2008/0116745 provide systems and apparatus for network and load control systems to shut off or reconnect power to a device. These methods and systems have the overall goal of controlling when electricity is provided to electrical devices in order to reduce peak demand and/or energy costs.

Adding to the efficiency losses in providing power from remote locations over a distribution grid, where more than two thirds of the energy may be lost as waste heat, are the overbuilding and underutilization of the generation and distribution of remote electrical energy because of the time of day and season to which said energy is demanded. With electrical generation, and also the distribution of natural gas, the support infrastructures are structured to provide for the peak demand loads residential home customers place on the systems. This peak demand only occurs for short periods of time within a day, for example between 6 am-9 am and 5 pm to 10 pm. This means that current natural gas and electrical generation and distribution infrastructures experience underutilized capacity for the majority of time of use. With time-of-use and smart meters being installed in large numbers, energy is becoming most expensive when it's needed the most.

Known cogeneration systems are deficient in certain regards by failing to take into account the nature of the costs, infrastructure scope, and consumer behaviour for the different types of energy demanded, largely dictated in part by society, work, and such. Because of this, utility companies must provide generation, transmission, and distributing capacity sufficient to service the potential maximum total demand of all their connected customers which occurs simultaneously all at the same time. This peak demand tends to follow a daily cycle with two peaks during the day—one in the early morning and one during the evening, and a seasonal cycle, with a peak in the summer in moderate and warm climates due in part to air conditioning, and a peak in the winter in colder regions due in part to space heating and hot water which account for more than 70% of their demand.

Electricity in particular has unique symbiotic relationships among generation, distribution, and consumption stakeholders. No one gives any thought to turning on a light in a room when they turn on the switch—but what is not widely understood or appreciated is that somewhere (possibly on the other side of the country) the energy required by their demand has to be generated and then distributed to them. Conversely, when a light is turned off, the energy that was being generated and provided now needs to go to another consumer almost instantly or a generation station needs to scale back its electricity production to compensate. If this near-instant interaction is thrown out of balance, brownouts and blackouts occur, resulting in significant problems, damage and lost economic output. As robust and available our energy systems are to the average consumer, the relationships and dynamics among all stakeholders are tenacious, tenable, and fragile. Because of this, the equipment and generating capacity which is necessary to maintain the system and supply peak demand energy becomes idle much of the time. Our energy systems experience heavy demands placed upon it, usually during time-of-day and seasonal peak demands which may coincide or collaborate, and causing failure to the system. In a sense, a single consumer can bring the whole system down for all other users on the grid by placing that one extra demand (i.e. space heater) on the system which causes excessive demand beyond what the system is capable of generating and distributing. A good parable is if everyone turns their water faucets on at the same time, no one would have any water pressure, and hence no water. The cost of overbuilding the generation and distribution systems to prevent the failure of the grid from excessive peak demand, and having capacity available 'just in case' must be borne by the utility company customers. In addition, there is significant estimating on the part of the utility companies regarding energy demand which results in either overbuilding generation and distribution infrastructure or non-availability of energy with resulting brownouts, blackouts, or complete grid service failure to customers.

With stiff environmental laws, long environmental impact study time cycles, and significant time delays combined with bringing new electrical generation and distribution infrastructure online, utility companies are challenged to provide electrical energy in a timely and cost-effective manner to their customers. Utility companies attempt to apportion such costs and estimates among their customers according to their respective peak usage by basing their electricity charges for individual customers upon their historical peak demand usage. Utility companies which provide natural gas to residential homes also face similar challenges and are actively working to reduce consumer peak demand on their infrastructure and product. It is expensive and disruptive for national gas suppliers to dig up and improve their distribution capacity.

Ultimately, Utility companies have limited control over their customers' energy consumption, demand, and future consumption, other than indirect means through the sponsorship of energy conservation measures applied to when customers use energy during the day, rebates for replacing inefficient consumer appliances, energy discounts to customers for time-of-use consumption, and the like. Some would say that Utility companies have very little or no control over their customers energy consumption, demand, etc. For instance, Utility companies may charge different rates for electrical energy used during predetermined times such as peak demand, intermediate, and off-peak periods during the day. Utility companies may also impose a peak-power demand charge based on the customer's usage of peak power demand during a predetermined demand period, such as during a 15-minute period over a day cycle.

SUMMARY OF THE INVENTION

The present invention includes both an apparatus or system, and a method for cogeneration and distribution of heat and electricity. The cogeneration apparatus or system includes:
  (a) an insulated and substantially air-tight hollow enclosure, wherein the enclosure is adapted to stand adjacent a habitat requiring space heating and electricity,
  (b) a fuel-burning electrical generator mounted in the enclosure a first ambient air intake and corresponding first ambient air intake conduit for communicating ambient air from outside of the enclosure, the first ambient air intake in fluid communication with an air intake on the generator, an exhaust conduit communicating exhaust from the generator to the ambient air outside the enclosure, and wherein the enclosure is sized so as to provide a warm-air space at least above and adjacent to said generator, and wherein the generator is adapted to supply supplied electricity to at least the one habitat,
  (c) a second ambient air intake into the enclosure, for example mounted on an upstream side of the enclosure, and providing ambient air into an airflow flowing in a downstream direction through the enclosure,
  (d) a fan mounted in the airflow, the fan urging said airflow in the downstream direction and through the warm-air space, a heat pump having a hot and a cold end, the heat pump mounted in the enclosure in the airflow and downstream of the warm-air space and arranged so that when heating of the habitat is required, pre-warmed air from the warm-air space flows to the cold end of the heat pump and so that air warmed by the generator impinges the cold end or condenser of the heat pump and exits the heat pump in the airflow flowing in the downstream direction from the heat pump,
  (e) an airflow redirector such as a valve mounted at a downstream side or end of enclosure, a heat pump conduit mounted to the airflow redirector for communicating the airflow into the habitat when the airflow redirector is in an airflow venting position,
  (f) a recirculating passageway within the enclosure in fluid communication from the downstream end of the airflow to the upstream end of the airflow, said recirculating passageway extending over the warm-air space, wherein the airflow redirector redirects substantially all of the airflow into recirculating passageway when the airflow redirector is in its airflow redirect position,
  (g) a thermal battery mounted in the enclosure, at least one heat exchanger capturing heat from the airflow and/or the exhaust conduit, and transferring the heat to the thermal battery when the generator is running, and selectively transferring stored heat from the battery to the airflow when the generator is not running and the heat pump and the fan are running.

The corresponding method includes providing habitats with such cogeneration apparatus or systems. At each such habitat an onsite energy ecosystem (OEE) controller controls operation of the generator, the heat pump and the at least one heat exchanger. During a peak energy demand period, said OEE controller controls the cogeneration system so as to generate electricity from the generator:
  (a) to supply the electricity to habitat, and
  (b) once the energy demand of the habitat is met then to supply excess electricity to other habitats having need of electricity from the cogeneration system, During an off-peak energy demand period, discontinuing operation of the generator unless there has been a power failure wherein mains utility grid power is not available to the habitat, in which case the cogeneration continues as during the peak energy demand period. The OEE controller controls using heat from the heat battery instead of heat from generator to warm the airflow when operation of the generator is discontinued.

The at least one heat exchanger may include an airflow heat exchanger in the airflow downstream of the warm-air space. The warm-air space is positioned to maximize capture of heat radiated from the operation of the generator. The passageway is positioned over the warm-air space so as to recapture heat from the warm-air space rising from the airflow so as to impinge the generator. The heat pump may be positioned above the generator within the enclosure.

In one embodiment the enclosure has an upper level and a lower level. The warm-air space, the airflow heat exchanger and the heat pump are in the upper level, and the generator and the heat battery are in the lower level. The airflow mixer, which may be a valve, and the airflow redirector are in the upper level. In that embodiment the upper level between the heat pump and the airflow redirector is substantially entirely redirected into the passageway when the airflow redirector is in its redirecting position.

The passageway is defined by the upper walls and ceiling of the enclosure. The fan may be downstream of the cold end of the heat pump. The enclosure may be mounted to a common side wall of the habitat, for example conformally hidden into the side wall of the habitat. Advantageously the enclosure has an access door opening to outside of the habitat, so that servicing of components within the enclosure may be done without having to enter into the habitat.

A thermal storage device may be mounted downstream of the generator. The thermal storage device may include an air duct journalled through an elongate heat battery. The heat pump cold end may include at least one condenser mounted in the air duct. The fan motivates the airflow to flow through the air duct. The thermal storage device may further include a water jacket sandwiched between the air duct and the heat battery. The thermal storage device may further include a heat reservoir core surrounding the air duct, so that the water jacket is sandwiched between the core and the heat battery. The core, the water jacket and the heat battery may all be cylindrical and nested one within the other respectively so as to surround the air duct. Hot exhaust from the generator may be directed via a conduit through the core so as to heat the core. A second heat exchanger may supply energy from the airflow to the heat battery. The water jacket may supply hot water for use in the habitat.

The method according to aspects of the invention may include providing the above cogeneration system in whole or in part, and the operation thereof.

The method may further include providing an airflow mixer mounted in the enclosure, downstream of second ambient air intake, and in an upstream position relative to the warm-air space. The second ambient air intake communicates ambient air from the outside of the enclosure to the airflow mixer. The airflow mixer directs the airflow in the downstream direction from the airflow mixer so as to flow in the downstream direction through the warm-air space. The airflow mixer receives recirculated airflow from the passageway and mixes it with the ambient air from the second ambient air intake in proportions according to instructions from the OEE controller so as to optimize efficiency of the heat pump by stabilizing a cold end temperature at the cold end of the heat pump within a predetermined optimal range of temperatures by operation of the controller to control the airflow mixer. Thus:

(a) when the generator is running and the habitat is to be heated:
  (i) electricity is supplied from the generator to the habitat of needed by the habitat, and excess electricity from the generator supplied to the other habitats or sold to a Utility,
  (ii) when the ambient temperature is above a predetermined low temperature, the mixer provides substantially completely all of the airflow from the ambient air and the airflow redirector vents substantially all of the airflow to the ambient air outside the enclosure,
  (iii) when the ambient temperature is below the predetermined low temperature, the airflow mixer progressively, as the ambient temperature drops, provides greater relative amount of the redirected airflow from the passageway and the airflow redirector valve correspondingly progressively closes the redirecting position from the venting position, and the fan urges the airflow into and along the passageway,
  (iv) the at least one heat exchanger stores heat into the thermal battery, (b) when the generator is not running and the habitat is to be heated:
  (i) the airflow heat exchanger extracts heat from the thermal battery and warms the airflow,
  (ii) the airflow mixer supplies the airflow into the warm-air space from substantially entirely the passageway and the airflow redirector is in the redirecting position wherein substantially all of the airflow is recirculated via the passageway.

BRIEF DESCRIPTION OF THE DRAWINGS

FIG. 11a is a chart of performance predictions according to a model of the onsite energy ecosystem.

DETAILED DESCRIPTION OF EMBODIMENTS OF THE INVENTION

Figure 1:
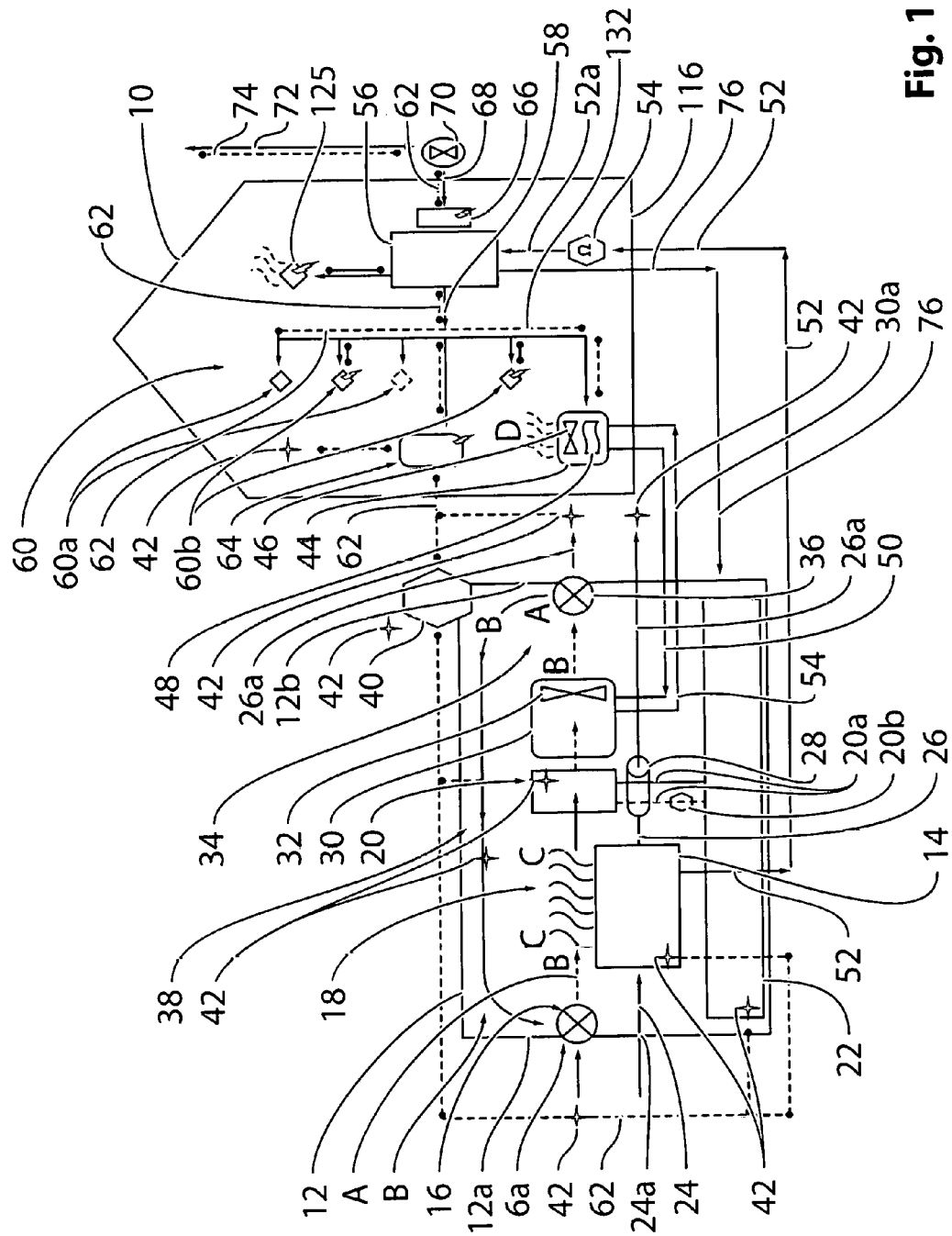
FIG. 1 is a diagrammatic illustration of one embodiment of the waste energy recycling and reclamation system for recycling and reclaiming waste energy from an electric generator to supply an air source heat pump within a modular enclosure adjacent a human habitat requiring space heating and electricity according to a local generation and heating/cooling management and control system.

A human habitat 10 typically requires supply of electricity and in winter also requires the supply of heat for the space heating of the habitat and in summer may require cooling also.

In a preferred embodiment of the present invention, which is not intended to be limiting, an enclosure 12 is situated adjacent habitat 10 in either a free standing embodiment or in an embodiment wherein the enclosure is mounted against or into one wall of habitat 10, which may include sharing a common wall with habitat 10. Enclosure 12 is preferably substantially sealed from the outside ambient air and in one embodiment, again which is not intended to be limiting, the efficiency of the system according to the present invention may be improved where enclosure 12 is sealed, insulated, and as better described below, has an internally controlled environment wherein the internal ambient temperature is regulated within an optimal temperature range for the operation of a heat pump which supplies heat to habitat 10, so as to operate substantially independently of the outside ambient air temperature. Enclosure 12 may be substantially sound proof so as to attenuate the radiation of noise coming from the various motors and pumps that are described below and contained within enclosure 12. This is also applicable for Enclosure 12 may be embedded into an external wall of habitat 10 so as to form an enclosed chamber that is part of the habitat's external wall and made to look like part of the exterior of the habitat.

In one basic configuration of the system contained within enclosure 12, a fuel-consuming electrical generator such as a natural gas, diesel, or fuel cell 14 is mounted within enclosure 12 along an upstream portion an airflow A flowing in direction B from a mixing valve 16 mounted adjacent an upstream wall 12a of enclosure 12. Mixing valve 16 mixes recirculated air within the enclosure, as better described below, with outside ambient air which is drawn in through an air intake 16a. No matter what kind of electrical generator is used, the function of the generator, other than generating electricity, is to generate heat to warm the air circulating within enclosure 12.

Generator 14 is positioned, and rigidly mounted within enclosure 12 so as to leave a void or warm-air space 18 around generator 14, and, in a preferred embodiment, so as to at least leave warm air space 18 above generator 14. Because generator 14 is a fuel consuming generator, and so gives off waste heat, the waste heat rises in direction C through, and mixes with warm air in warm air space 18. The waste heat from generator 14 thus imparts heat to airflow A as it flows in direction B, ie in a revolving air mass, through warm air space 18 and into heat exchanger 20.

Heat exchanger 20 may be an air-to-fluid heat exchanger, where, for example, the fluid is transferred within a closed circuit 20a and pumped there through by pump 20b. Heat is thus extracted from airflow A as it passes through heat exchanger 20 and the heated fluid from the heat exchanger then pumped via closed circuit 20a into thermal battery 22. Within thermal battery 22 heat from heat exchanger 20 is extracted from the heat transfer fluid within closed circuit 20a so as to be stored within thermal battery 22. In one embodiment not intending to be limiting thermal battery 22 may include a solid to liquid phase change heat storage device for example employing paraffin wax. Other thermal batteries which are conventionally known would also work as would be known to one skilled in the art.

Generator 14 uses outside ambient air conveyed through air intake 24a and via conduit 24 for use in the combustion process within the internal combustion motor of generator 14. The exhaust products from the combustion are exhausted through exhaust conduit 26 into heat exchanger 28. Heat exchanger 28 may advantageously be a separate heat exchanger, separate from heat exchanger 20, or may be formed as part thereof, and operates to extract heat energy from the exhaust products flowing from generator 14 through exhaust conduit 26. The heat extracted by heat exchanger 28 is conveyed, for example by means of closed circuit 20a or a separate closed circuit containing heat transfer fluid so as to transfer heat energy from the exhaust into thermal battery 22. Cooled exhaust leaving heat exchanger 28 flows via exhaust pipe 26a through the downstream wall 12b of enclosure 12 so as to be vented into the outside ambient air outside of enclosure 12.

Airflow A exiting heat exchanger 20 enters into heat pump 30 wherein airflow A supplies heat energy to the cold end of heat pump 30. A fan 32 urges airflow A in direction B from heat exchanger 20, through heat pump 30 and, continuing in direction B, into and through venting chamber 34. Valve 36, when opened, allows airflow A to vent through downstream wall 12b so as to thereby exit enclosure 12 into the outside ambient air. When valve 36 is closed, airflow A entering in direction B into venting chamber 34 is redirected in direction B' along and through recirculating passageway 38 so as to return to the upstream end of airflow A at mixing valve 16. When mixing valve 16 is biased into its mixing mode, a recirculating air stream in passageway 38 and arriving at valve 16 in direction B' is mixed with outside ambient air entering enclosure 12 through intake 16a whereby airflow A is preheated with the warmed airflow from recirculating passageway 38. In one embodiment, not intended to be limiting, mixing valve 16 may be progressively biased so as to change the relative amounts of warmed air arriving in direction B' from passageway 38 with outside ambient air arriving by intake 16a. Heated air from heat pump 30 is provided to the air handling system 44 within habitat 10 via conduit 30a.

In one preferred embodiment, a controller 40 receives temperature data from sensors 42, for example, from sensors 42 positioned to measure outside ambient air temperature, generator temperature, thermal battery temperature, primary heat exchanger temperature (that is, the temperature within heat exchanger 20), recirculating passageway 38, exhaust temperature in the generator exhaust, the temperature of airflow being vented through valve 36, and the internal temperature within habitat 10. Given the data from sensors 42, controller 40, as better described below, controls the position of valves 16 and 36, and, in cooperation with the OEE in habitat, controls whether the generator 14 is operational, whether the heat exchangers are operational by controlling the operation of pump or pumps 20b, and whether the heat pump is operation and whether the fan or fans are in operation. Controller 40 and OEE, in combination and cooperating with one another, may also compare other data such as time of day, peak demand, opportune generation demand by the NEE (defined below) for supply of electricity to the neighborhood, or by the CEE (defined below) for supply to the larger community.

In a preferred embodiment, airflow A is not directed in direction B or direction B' by the use of discreet conduits, for example rigid tubular conduits, but rather the cavity within enclosure 12 in which the various components including generator 14, heat exchanger 20, thermal battery 22, heat pump 30, and fan 32, are mounted is otherwise left open. The only wall or baffles that are used other than to support the weight of the components, are provided to seal underneath the heat pump and venting chamber to force airflow to be re-directed in direction B'. The waste energy producer, namely the electric generator 14, is mounted within enclosure 12 at a lower elevation than the heat energy user, namely heat pump 30, which is mounted within enclosure 12 at a higher elevation and offset downstream along direction B relative to the position of generator 14. This arrangement of the generator and heat pump, combined with the use of an open cavity within enclosure 12, provides for an efficient scavenging of waste heat as the warmed air with its decreased density naturally rises up through the cavity within enclosure 12. This recognizes then the fact that no single heat reclamation device such as heat exchanger 20 is completely efficient and, capitalizing on this inefficiency, allows the operation of the present system in an efficient manner when taken as a system as a whole as heat from compressors, pumps and the like is captured where normally is 'lost' to the atmosphere. The revolution of the air mass around the interior of enclosure 12 collects and re-uses all of this otherwise lost heat energy by the pre-warming of air to the cold end of heat pump 30. In a sense, the enclosure 12 may be thought of as a hollow "egg" which smoothly revolves the air mass within its chamber, as it warms from waste heat in the upper reaches of the hollow within the egg, so as to pre-warm air which re-circulates in the a revolving air mass pattern to the air intake of the heat pump.

Thus the waste heat rising naturally in direction C passes through and intersects with airflow A being drawn across generator 14, and the compressors and pumps, from mixing valve 16 to venting valve 36 by the operation of fan 32. Naturally the waste heat rising in direction C will not all be carried and mixed into airflow A so as to pass through heat exchanger 20, some of the waste heat rising in direction C will pass upwardly into open passageway 38, that is, into the upper hollow of the virtual (or physical) egg-shaped hollow for smooth revolution of the air mass. In addition, heat exchanger 20, as stated above, is not completely efficient at removing heat energy from airflow A, and in the present system it is not required that heat exchanger 20 be completely efficient because waste heat carried in airflow A down stream from heat exchanger 20 is reclaimed by the revolving recirculation of airflow A in direction B' through the upper hollow of open passageway 38 when venting valve 36 is closed. Although the warm airflow A leaving pump 30 will naturally rise so that when venting valve 36 is closed the natural inclination of warm airflow A will be to rise in direction B', in a preferred embodiment, as stated above venting chamber 34 is sealed, or at least substantially sealed for example by the use of baffles or the like, underneath heat pump 30, or at least underneath fan 32 so that, when venting valve 36 is closed, airflow A is forced upwardly from direction B and redirected in revolution direction B' so as to recirculate along the upper hollow of passageway 38. As airflow A revolves or re-circulates in direction B' any warm air rising within the hollow cavity of enclosure 12, whether it be waste heat from generator 14, or waste heat from compressors or pumps, or otherwise heat rising naturally from eddies of airflow A mixing with internal ambient air within enclosure 12, is entrained into airflow A revolving in direction B' through passageway 38.

In a preferred embodiment, passageway 38 is thus an open hollow or conduit or elongate chamber defined for example by the walls and ceiling inside enclosure 12. It need not be egg-shaped in order to act as a virtual hollow egg for the revolution of the warming air mass. Thus, although as illustrated, airflow A is portrayed as a discreet linear flow in direction B and a discreet curvi-linear flow in direction B', airflow A may be thought of as a circulating or revolving current or mass of warm air. By the operation of the intake and venting valves 16 and 36, and the operation of generator 14 and other waste heat generators, or by the substitution of stored energy from thermal battery 22 until the battery is depleted, the internal ambient temperature within enclosure 12 and in particular airflow A is stabilized within a desired range of temperatures within which heat pump 30 is efficient or most efficient. It must be kept in mind that as the outside ambient temperature falls and approaches temperatures below zero, without the stabilizing environment according to the present invention within enclosure 12, the efficiency of heat pump 30 also quickly falls so as to render heat pump 30 virtually useless for heating or assisting in heating habitat 10.

In a further embodiment one of heat exchangers 20, 28, or a further heat exchanger, is used to heat hot water for the habitat for example using a conventional hot water tank arrangement located in the habitat or in enclosure 12 (preferably the latter). Hot liquid coolant from the heat exchanger used is directed through coils in the hot water tank to thereby either pre-heat, or entirely heat the hot water. In the further embodiment set out below, a water jacket is employed in conjunction with the heat battery in a cylindrical thermal storage device to provide hot water supply.

One of the objects of controller 40 is to, as best it can, balance the production of energy via the waste heat from the operation of generator 14, compressors and pumps within enclosure 12, with the use of stored energy from within thermal battery 22, and in a further embodiment described below, within a hot water storage tank, so as to maintain a somewhat stable temperature within enclosure 12 when the outside ambient temperature is falling or already sufficiently cold that, without the artificially warmed internal environment within enclosure 12, heat pump 30 would be inefficient, or in it's defrost cycle, or otherwise un-useful in producing heat. When the outside ambient temperature is warmer controller 40 may then otherwise employ the waste heat to primarily charge the thermal battery 22 so as to store as much energy as possible in thermal battery 22. Once the thermal battery is charged, the controller may either turn off the use of generator 14, thereby switching the electrical usage within habitat 10 back to a main power supply from the utility grid, or, if it is desired because of power consumption costs (for example if the controller determines it is a peak usage period) or power is not available from the utility grid, then controller 40 may signal the NEE to supply electricity from a neighbourhood co-generation unit according to the present invention, or may continue operation of generator 14 and excess heat energy may be dumped from within enclosure 12 by the opening of valve 16 to allow ambient outside air to flow into enclosure 12 through intake 16a and to vent warm air from enclosure 12 via valve 36. Defrost, although normally a negative factor as requiring energy while disabling the heat pump, may be used in the present cogenerator system to, when cost advantageous to do so, heat for example hot water even though actual defrosting of the heat pump is not required.

As would be known to one skilled in the art, heat pump 30 may be of the kind which may be used for both heating and cooling of habitat 10. As controller 40 detects a rising outside ambient air temperature, when it becomes desirable to cool habitat 10 instead of heat habitat 10, then as fan 32 draws in outside ambient air temperature air in direction B heat exchanger 20 may be employed to cool airflow A before it enters into heat pump 30 for example by supplying cooling fluid into heat exchanger 20 within habitat 10, from a geo-thermal heat sink or other source of cooling such as refrigeration coils 48. Extracted heat may be used to heat hot water for habitat 10, thermal storage, in-floor heating, etc.

One source of cooling, as illustrated, may be an air mover or air handler system 44 which contains a fan 46 and, in one embodiment, not intended limiting, refrigerant coils 48. Fan 56 circulates air throughout habitat 10 and circulates air over refrigerant coils 48. Refrigerant line 50 carries refrigerant between heat pump 30 and air handler system 44 so as to provide either heat or cooling air D into habitat 10.

Electrical feed 52 provides electricity from generator 14 to power inverter 54. Power inverter 54 provides power to distribution panel 56 via electrical feed 52a. Distribution panel 56 provides power via electrical circuits 58 to electrical outlets 60 within habitat 10, which may include conventional electrical power plugs 60a or controlled electrical connections 60b, controlled by way of communications links 62 communicating with an Onsite Energy Eco-system management system controller 64, which may also form part of controller 40.

A controlled electrical utility disconnect/transfer switch 66 controls the electrical connection to the utility mains power grid via electrical connection 68 utility meter 70 and utility electrical connection 72. Communications link 74 provides for communication between the onsite energy management system controller 64 and a neighbourhood energy management system better described below. Electrical power to the various components within enclosure 12 is provided from distribution panel 56 via electrical circuit 76.

Figure 10B:
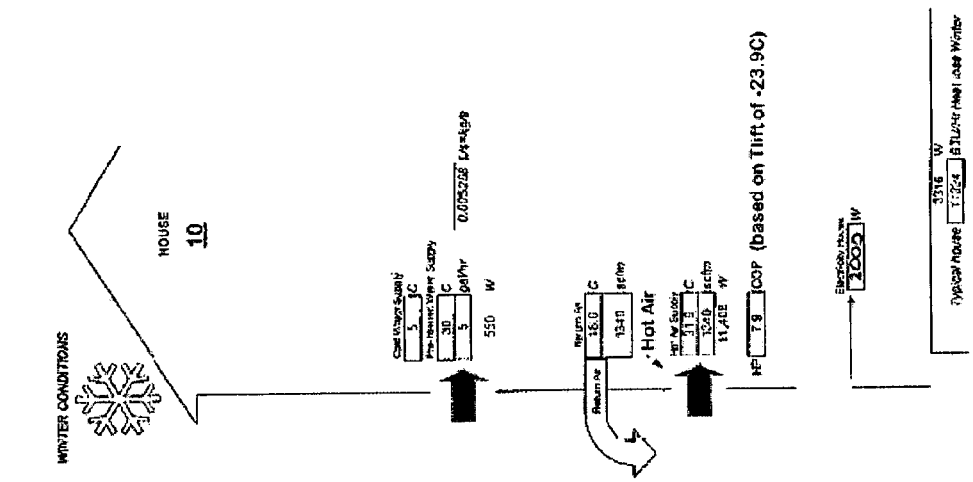
FIG. 10 is a diagrammatic graphical thermodynamic model of one embodiment of the cogeneration system according to one aspect of the present invention under winter conditions heating a habitat and generating electricity for the habitat and for distribution on the neighborhood grid.
Figure 10A:
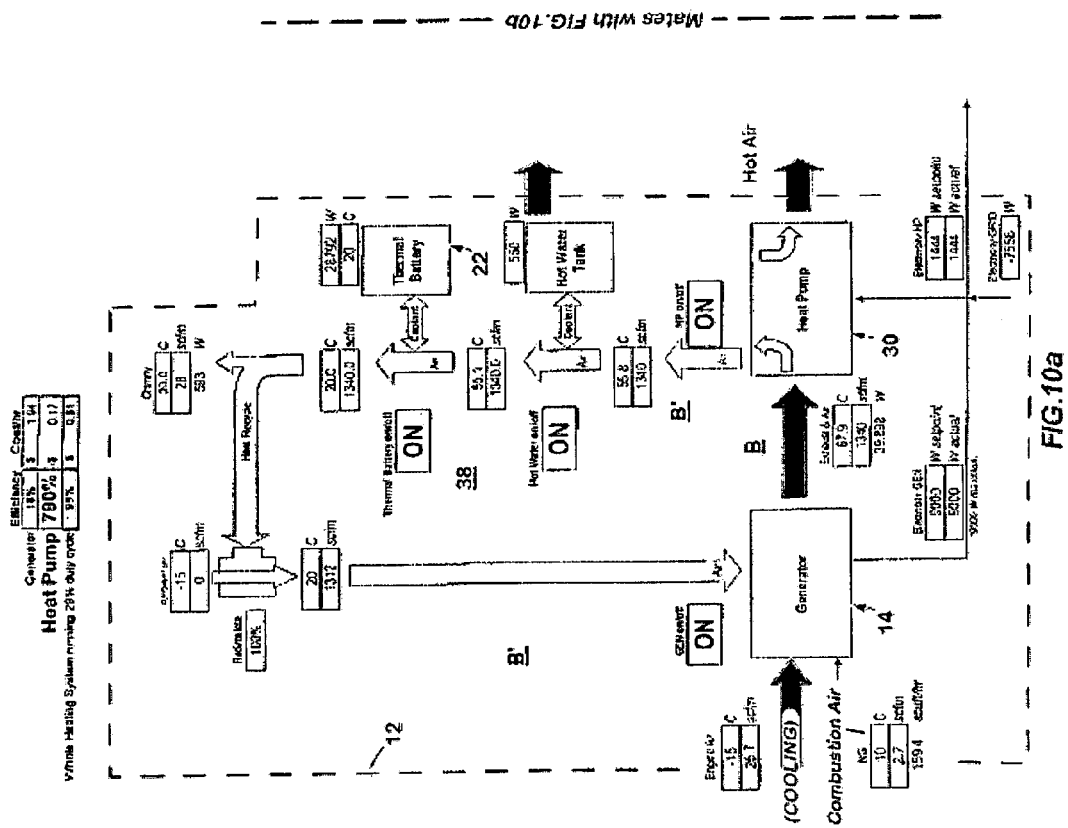
Figure 11:
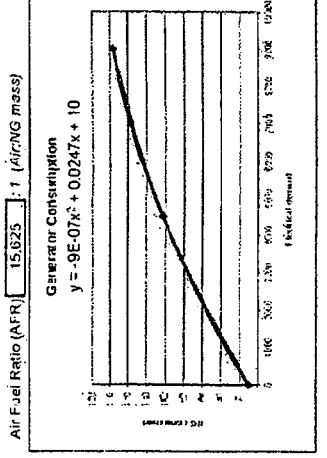
FIG. 11 is a set of tables setting out the assumptions and calculations supporting the model of FIG. 10.
Figure 12:
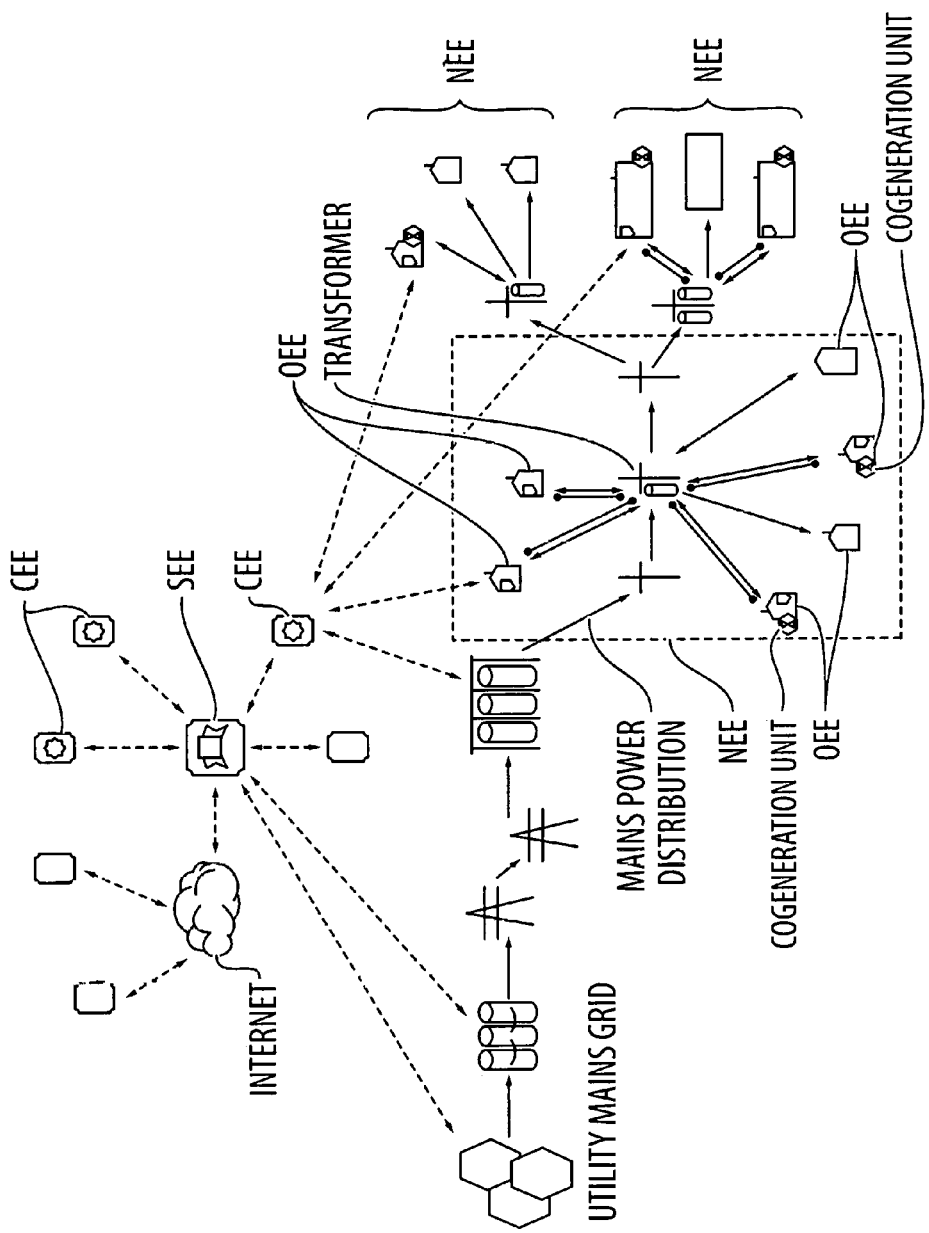
FIG. 12 diagrammatically illustrates habitats each sharing an onsite energy ecosystem, and clusters of such habitats forming a neighbourhood energy ecosystem, and clusters of such neighbourhoods forming a community energy ecosystem and clusters of such community energy ecosystems forming an overall synergistic energy ecosystem.

The winter operation of a co-generation unit according to the present invention is modeled in FIGS. 10 and 11, wherein FIG. 10 is a diagrammatic representation showing temperatures and flow rates, and the FIG. 11 sets out the calculations and assumptions associated with and supporting the graphical model of FIG. 10. Notably, the ambient air temperature is −15 degrees Celsius, the air temperature of air flowing from the electrical generator and supplied to the cold end of the heat pump is 67.9 degrees Celsius (which energy would otherwise be lost as waste heat), the hot air supply temperature to the habitat from the heat pump is 31.9 degrees Celsius (with a return air temperature of 18 degrees Celsius), the air temperature of air flowing from the cold end of the heat pump to a hot water tank heat exchanger is 55.8 degrees Celsius, and then to the heat battery heat exchanger is 55.1 degrees Celsius. The air temperature of air flowing in the air mass revolving in direction B' the enclosure (shown in dotted outline) to return the airflow to, and over/around the generator, (so as to take up the waste heat from the generator) is 20 degrees Celsius.

Although the graphical model is not meant to infer a sole reliance on the embodiment of FIG. 1 (modified to add a hot water heat exchanger), as the graphical model is meant to apply to other embodiments, such as set out below, of the cogeneration system, for ease of reference the reference numerals and reference letters from FIG. 1 are used on the corresponding parts of the graphical model. Further, although the numerically modeled temperatures, flow rates, power consumption and power generation shown in the graphical model are meant to indicate the expected data trends, applicant does not wish to be held to the exact numerically represented results (temperatures, power generation, efficiencies etc.) as variables beyond those accounted for in the graphical model and factors affecting the assumptions underlying the graphical model calculations may affect the actually obtained results obtained in implementing the co-generation aspect of the present invention. However, that being said, the graphical model, based on a generator efficiency of 18 percent, returned an overall efficiency of 99 percent at a cost per hour of $0.51 resulting from a heat pump COP efficiency of 7.9, at a cost per hour of—$0.17. The graphical model assumed a two kilowatt power consumption in the habitat and approximately 5.5 kilowatts of power output to the neighbourhood grid according to policies managed by the NEE as set out below.

Figure 3:
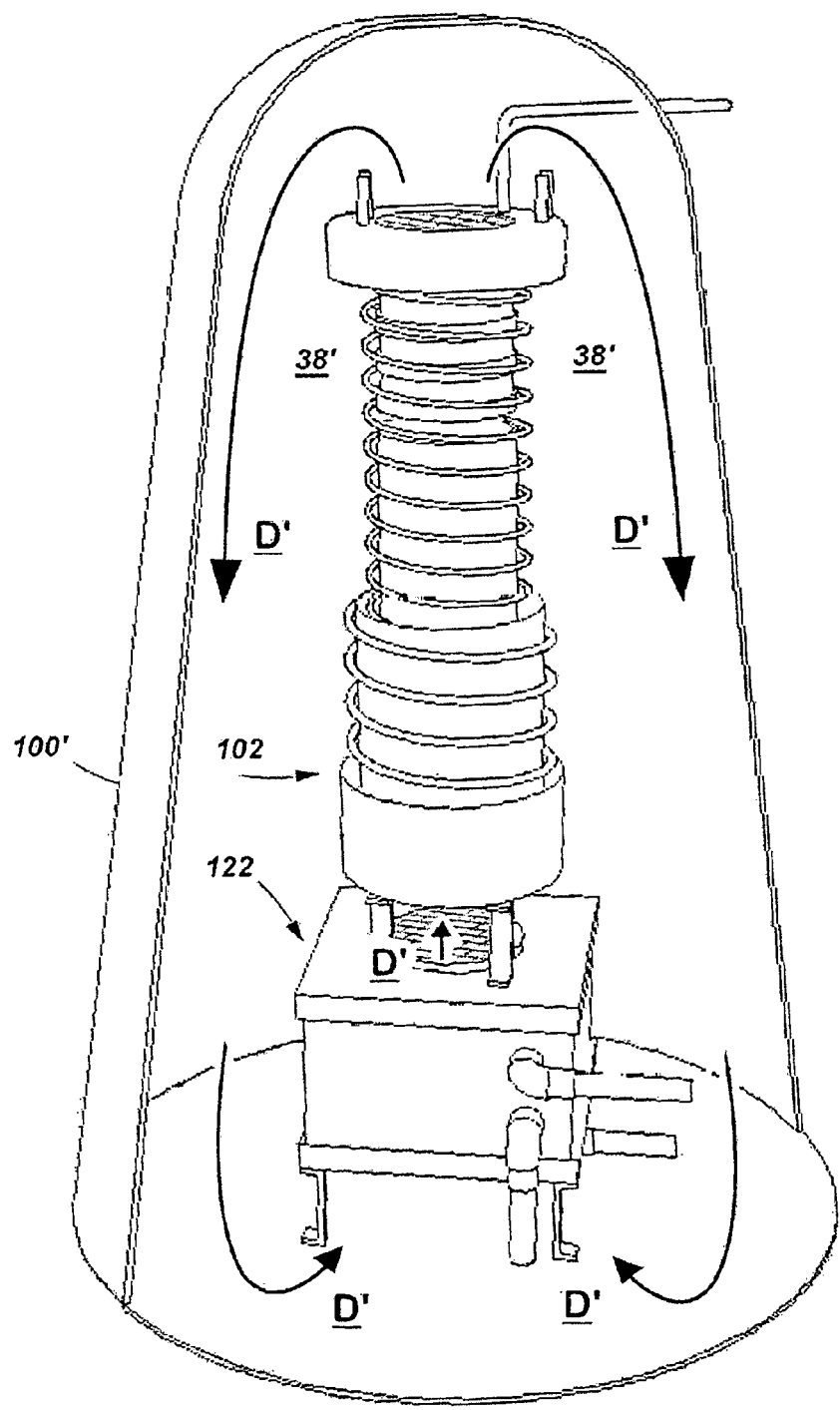
FIG. 3 is, in partially cutaway perspective view, yet a further embodiment of the cogeneration system according to one aspect of the present invention with the thermal storage device mounted vertically in the enclosure.
Figure 4:
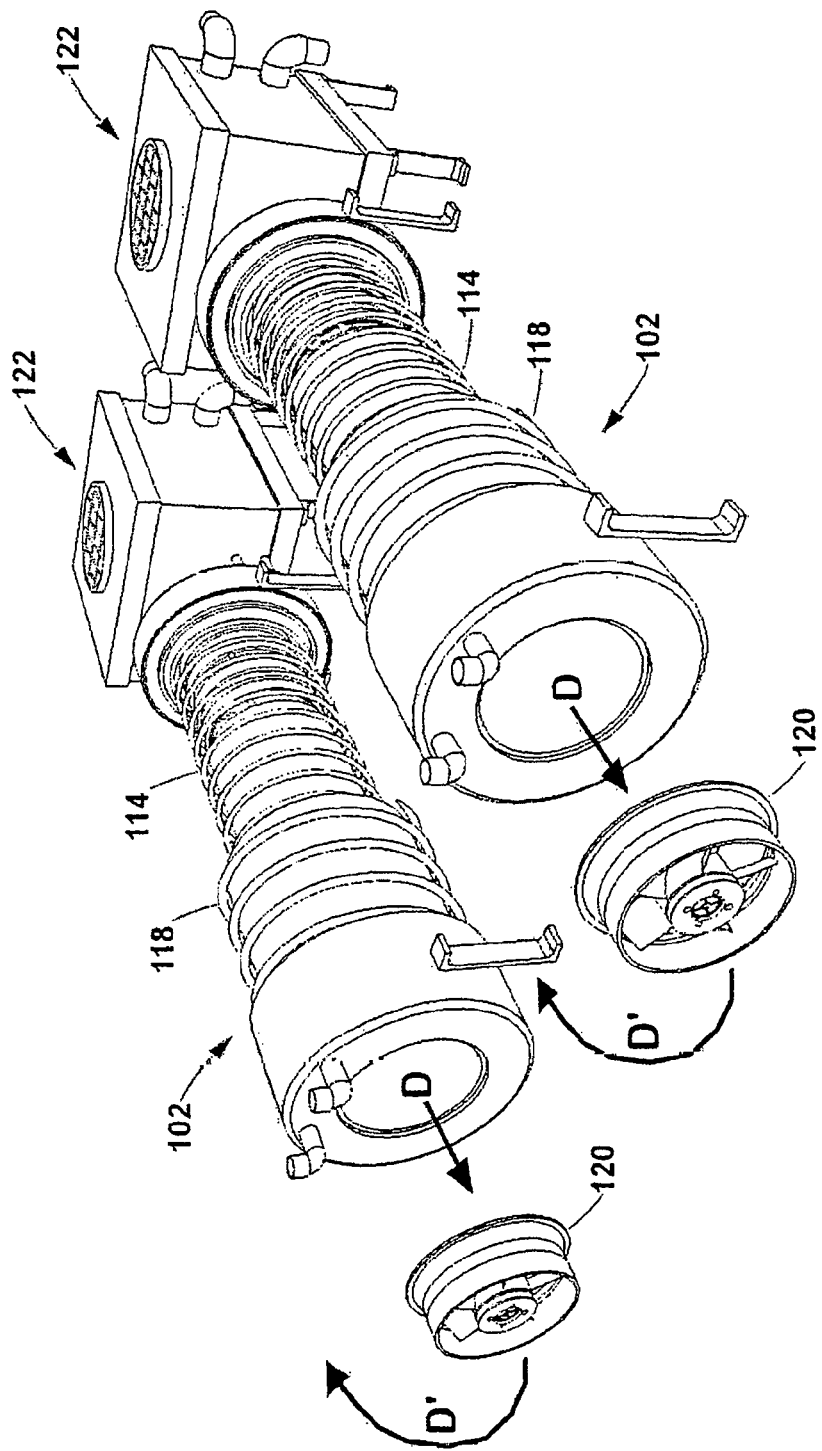
FIG. 4 is, in front perspective view, a pair of adjacent cogeneration systems of FIG. 2.
Figure 5:
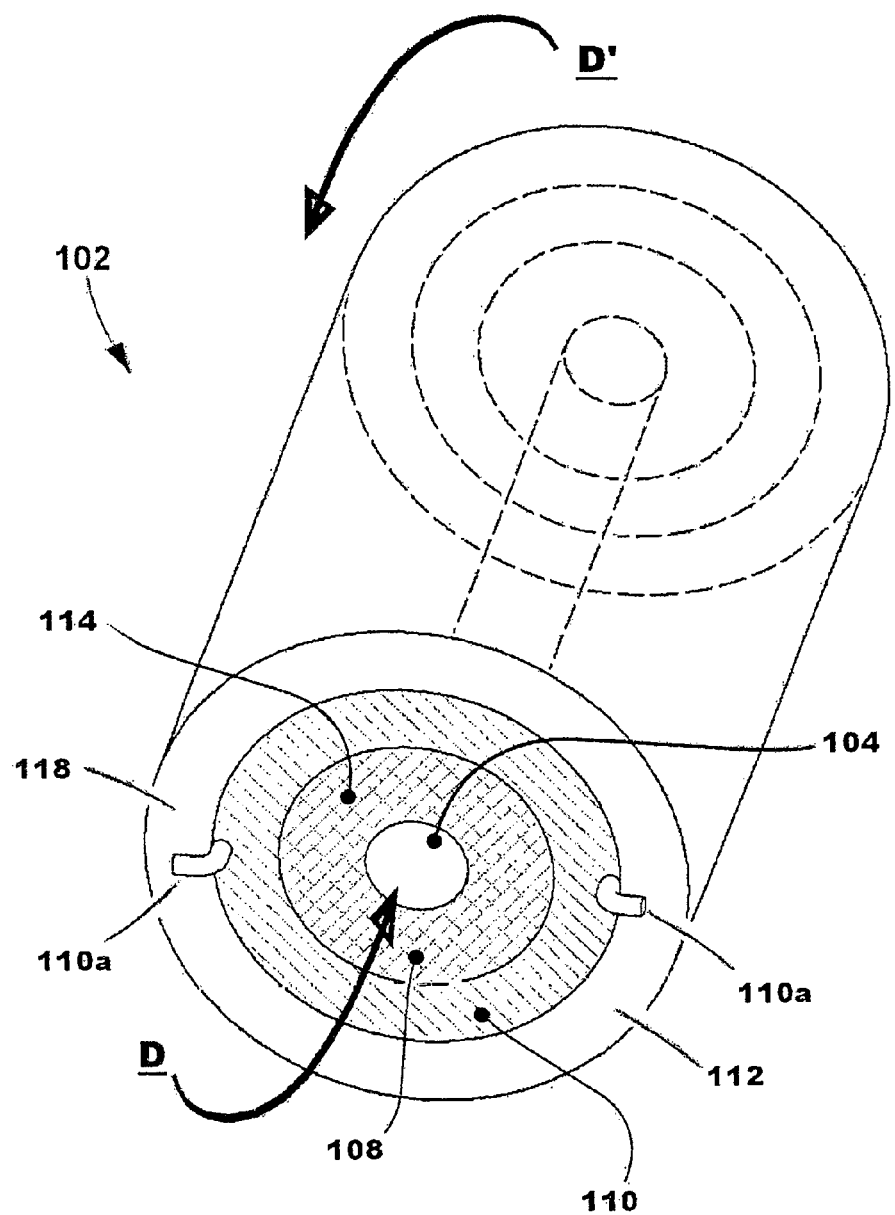
FIG. 5 is, in partially cutaway diagrammatic front perspective view, a section of the thermal storage device of FIG. 2.
Figure 6:
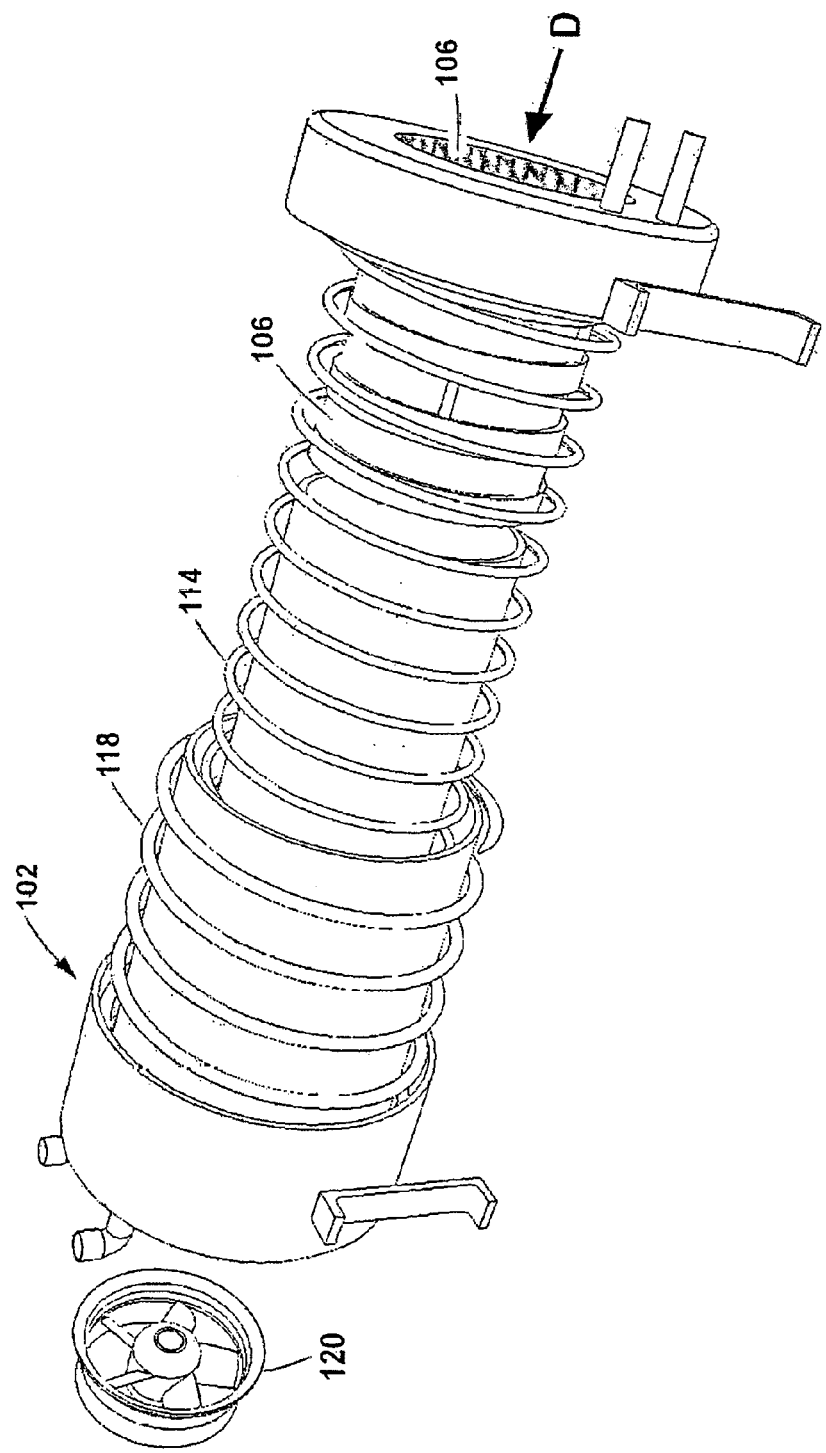
FIG. 6 is, in partially exploded cutaway view, the fan and thermal storage device of FIG. 2 showing the outer casing cutaway to expose the helical coolant coil in the heat battery layer (with the heat battery removed), and the water jacket casing cutaway to expose the helical coolant coil in the solid core layer (with the solid core removed), and exposing the heat pump condensers mounted in the central hollow airway duct.
Figure 7:
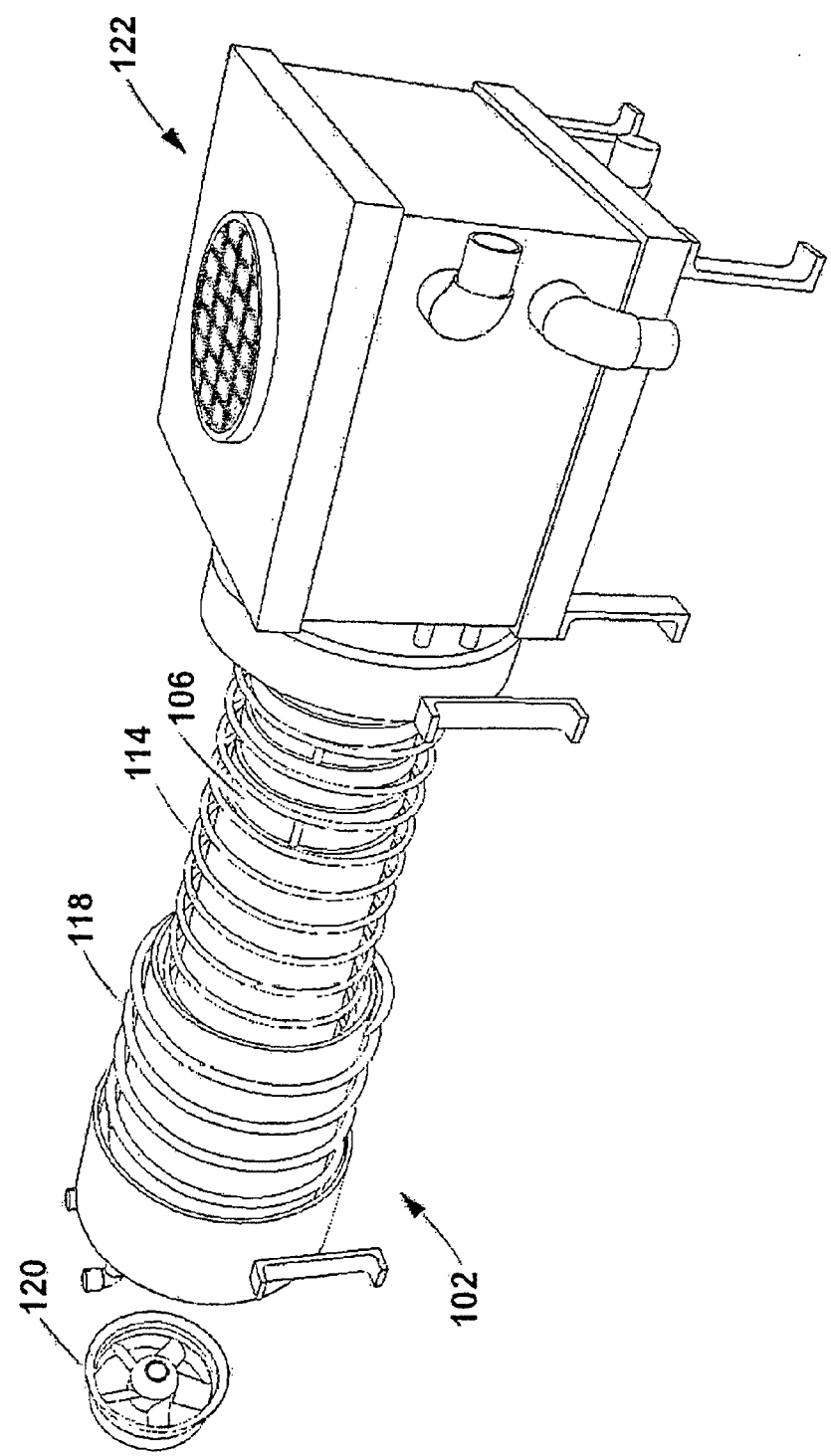
FIG. 7 is, in side elevation view, the cutaway view of the thermal storage device of FIG. 6 mounted adjacent and downstream of the corresponding generator.
Figure 8:
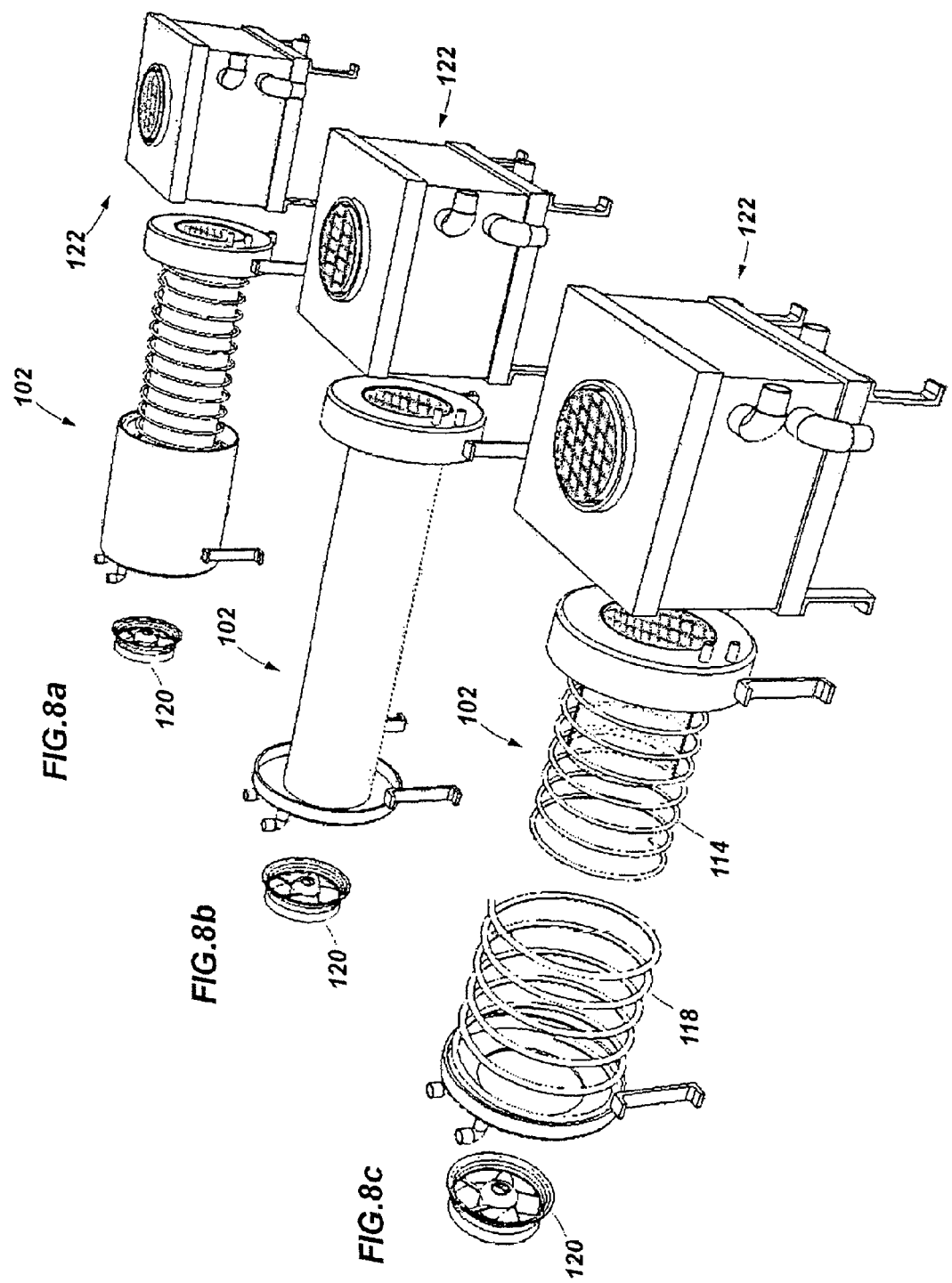
FIG. 8a is, in partially cutaway perspective view, the cogeneration system of FIG. 7 showing the water jacket casing.
FIG. 8b is, in partially cutaway perspective view, the cogeneration system of FIG. 8a showing the water jacket casing in its entirety.
FIG. 8c is, in partially cutaway perspective view, the cogeneration system of FIG. 8b showing the partially cutaway helical coils of the heat battery and solid core layers.

In the alternative cogeneration system embodiment of FIG. 3, the arrangement, as compared to FIG. 1 of the heat pump, the heat battery, and the generator is re-arranged within the enclosure. In particular, within enclosure 100, cogeneration unit thermal storage device 102 includes a hollow central duct 104 for the flow of air through duct 104. Duct 104 contains the condenser 106 of a heat pump arranged within the duct. Duct 104 is formed within and along a solid cylindrical heat retaining core 108. Core 108 forms part of the thermal storage device 102. A water jacket 110 is formed between core 108 and thermal battery 112. Water jacket 110 is shaped, for example as the cylinder depicted, although this is not intended to be limiting, so as to provide a heat reservoir in a sleeve around core 108. Duct 104 and core 108 may be cylindrical for evenly distributed heat transfer, or may be other shapes in cross-section, other than circular, so long as encased, for example entirely encased, within the water jacket and the rest of the multi-layer thermal storage device. Thus water jacket 110 is itself encased, for example entirely nested within, encircling heat battery 11. Heat battery 112 is, for example, a layer containing paraffin wax to provide energy storage for the heat battery. The overall thermal storage device comprising core 108, water jacket 110 and heat battery 112 may thus be cylindrical as depicted, although again this is not intended to be limiting.

Figure 2:
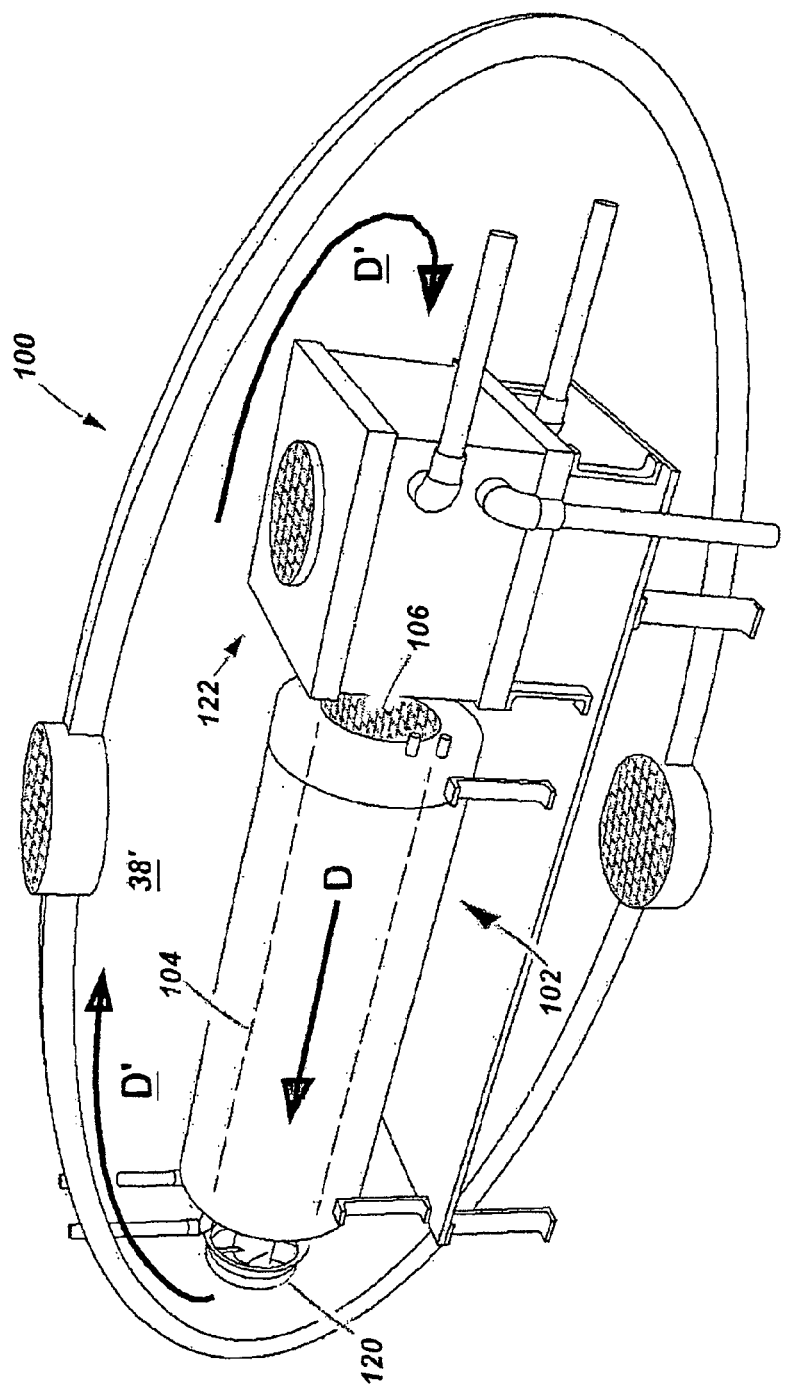
FIG. 2 is, in partially cutaway perspective view, a further embodiment of the cogeneration system according to one aspect of the present invention with the thermal storage device mounted horizontally in the enclosure.

Because of the nested arrangement of the layer of the thermal storage device around the hollow duct 104, separate heat exchangers to heat core 108 or heat battery 112 or to provide heat for hot water, in floor heating, etc. may not be required. Otherwise separate heat exchangers may be employed to expedite heat transfer, in which case the corresponding pumps would, as before, be mounted within enclosure 100 so as to add their waste heat to the air mass warming within the enclosure. The enclosure may approximate an oval or "egg" like shape, or be otherwise domed inside enclosure 100 for efficient revolution in direction D of the air mass within enclosure 100 from one end to the other of the hollow duct 104, as seen in FIG. 2.

Hot exhaust from generator 122 flows through a helical coil manifold 114 in core 108. This heats the core 108 which in turn heats both the airflow D through duct 104 (which heats condensers 106), and the water in water jacket 110. Helical coil 118 in heat battery layer 112 contains liquid coolant or refrigerant for heat exchange into or out of the thermal battery layer for heating or pre-heating a radiator or in-floor heating. Water jacket 110 serves as a hot water tank to provide hot water for use in the habitat, and also provides both a heat reservoir, and a heat transfer medium between the core and the heat battery when the domestic hot water in water jacket 110 is not being used, for example, during off-peak demand. This uses what would otherwise be waste heat lost from a stand-alone hot water tank within the habitat. Water flows into and out of water jacket 110 via conduits 110a.

In the alternative embodiment of FIG. 3, enclosure 100', rather than being elongate horizontally, is elongate vertically, for example, is bell-shaped as illustrated, so as to accommodate a vertically oriented cogeneration unit thermal storage device 102. The generator 122 is mounted thereunder so that airflow D is vertical, taking advantage of the warm airflow naturally rising, the cooler return airflow D' (the equivalent of return airflow B' in FIG. 1) thereby flowing downwardly assisted by the natural falling of cooler, more dense air.

Figure 9:
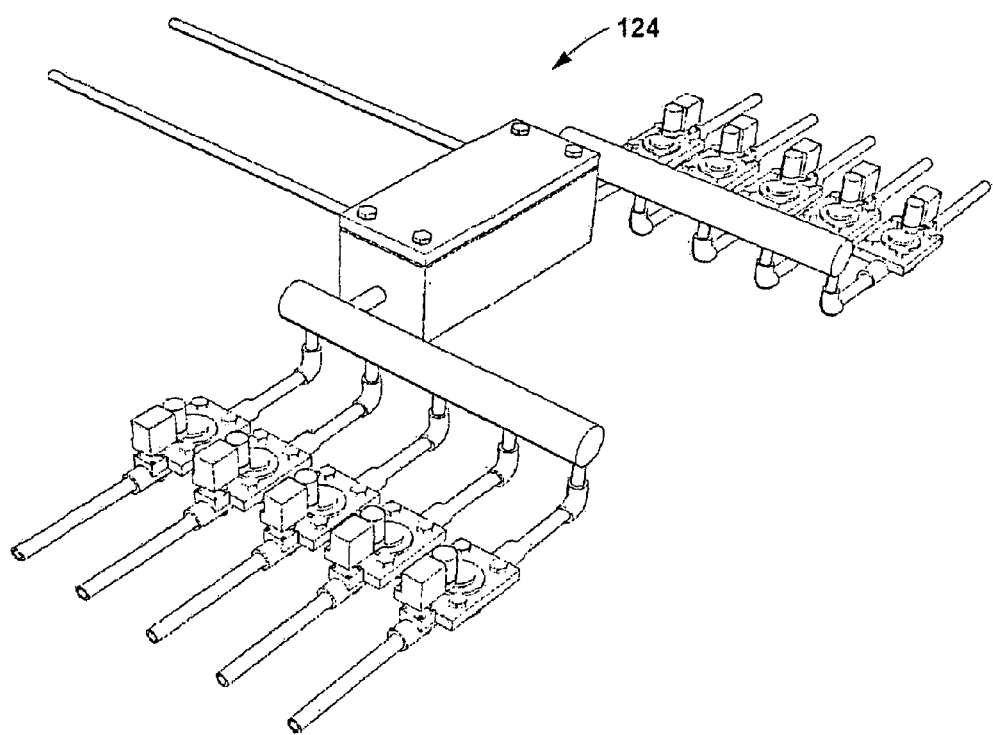
FIG. 9 is, in perspective view, a five way solenoid controlled flow directing valve for directing coolant from the heat pump to end uses for heating or cooling the habitat.

In a further embodiment, the '5-way' solenoid coil heat exchanger system of FIG. 9 may be provided for use with a single air source heat pump with the condenser 106 integrated within the internal duct 104 providing the airway passage of cogeneration unit 102. The solenoids provide for switching or redirection of coolant/refrigerant flows to and from the heat pump condensers 106 so as to: heat domestic hot water, charge/deplete thermal storage battery, heat infloor heating fluid, provide space heating (air handler a-coils), capture heat from exhaust gases using separate air chamber which includes baffles, etcetera while also providing 'muffler' functionality, 'move' or 'shift' energy between the various cylinder chambers (ie: charged domestic hot water thermal energy is extracted when not needed to provide thermal energy to space heating process), capture and store air conditioning thermal energy to various cylinder 'layer' components; heat domestic hot water, heat infloor fluid, and heat the thermal storage battery.

The enclosure air mass in enclosure 100 is pulled/pushed by a fan through the center duct 104 of the cylindrical thermal storage device, passing through one or more heat exchangers, exiting the thermal storage air duct 104, naturally rising towards the upper part of the enclosure 100. The air is then circulated back towards the entrance of the air duct 104 where the air-cooled generator's air intake then uses the air to cool itself while introducing thermal energy to the air, the air repeating its path in a revolving manner around the interior of the enclosure.

The generator exhaust flows through a spiral conduit which is positioned within a solid heat-retaining core adjacent to the air canal, through a conduit that spirals around the second core. The second core contains a solid material that is advantageous for extracting the thermal energy from the flue gases, such as a mixture of ash & resin, or carbon & cement, or other mixture as would be known to one skilled in the art and is sized accordingly to extract & store the maximum amount of heat energy before exhausting the flue gases.

One or more heat exchangers are placed at the entrance, exit or inside the AIR chamber so that the air passes through said exchanger(s) to extract or introduce thermal energy as the case may be between the air and thermal storage device, or between the various cylindrical core layers. The adjacent cores conduct thermal energy between each other as they are in contact with each other.

The material, design, and surface area of the enclosure 100 captures thermal energy from the sun along with being insulated and sealed to capture and minimize any loss of thermal energy that is generated within its enclosed area. The enclosure's internal chamber is smoothly curved to assist air to circulate within the chamber in a revolving manner. In addition, the enclosure provides protection from the elements, resisting material build-up, and wildlife encroachment and prevents obstruction of air intake and exhaust by raising a lid section to control air exchange and venting.

The following is an example of a Heating Cycle:

The thermostat registers a temperature below a desired pre-set temperature and signals for the OEE to request heat. Before engaging the cogeneration system to provide heat the OEE controller checks the time of day, determining that said request is occurring at peak demand. It cross-references this information with its Peak Demand Policy which instructs the OEE controller to generate electricity between 6-9 am if heating is required. The OEE controller then executes the following processes/activities:

a. Checking its Policies, the controller finds that a Net Meter Policy instructing the cogeneration unit to provide excess electrical energy to the NEE grid or Utility grid if the energy is available and has a Pre-Approved Authorization.

b. The cogeneration unit starts its air-cooled generator and ramps up to provide its maximum electrical power, for example 5 kW.

c. Air movement starts within the enclosure chamber; passing through the generator's air-cooling intake and air exhaust which contains heat energy extracted from the generator and cycles though the heat exchanger(s) and Thermal Storage device (heat battery)

d. Sensors feed the controller with data including:
       i. Air temperature
       ii. Humidity
       iii. Thermal energy available in the Thermal Storage Device e. The generator provides electricity to the cogeneration units internal systems and components, synchronizing its excess electrical generation with the electricity being delivered to the site from the Utility.

f. The generator's combustion and exhaust flue gases are separate conduit from the enclosure chamber, ensuring there is no contamination of the chamber's air from the generator's combustion process.

g. The generator's exhaust flue gasses pass through the Exhaust Thermal Storage which extracts a significant portion of the flue gases' thermal energy before being expelled to the outside atmosphere.

h. The air temperature in the enclosure chamber slowly increases from waste energy in the enclosure given off by the generator, pumps, etc by revolving through the chamber. The various heat exchangers either extract or introduce thermal energy to the chamber air.

i. Sensors provide real-time feedback to the cogeneration unit controller.

j. In conjunction, the cogeneration controller reacts to control instructions from the:
       i. OEE system & Policies
       ii. Requests from the Neighbourhood Energy Ecosystem (NEE) or Community Energy Ecosystem (CEE) for energy production k. While generating electricity and heat from the OEE's initial request, the Thermal Storage device(s) is/are slowly charged for later use when heat is required when Policies dictate the generator to not generator electricity but heat is needed for the habitat.

l. In conjunction with the above, a combination of hot water, infloor heating coolant, or refrigerant which is contained within separate conduit lines passes in a spiral pattern within each of their respective Thermal Storage components to either introduce or extract thermal energy synergistically between each.

m. When the OEE signals that the desired temperature has been reached, the cogeneration controller then checks the Policies for instructions in view of the following:
   i. Generator runtime,
   ii. Thermal Storage device thermal capacity level,
   iii. Requests if any, for electrical energy from NEE or CEE n. Depending upon the state of thermal storage, and demand for electricity, the cogeneration unit may continue to generate electricity, further charging the Thermal Storage, or cease operation, or provide electricity and/or expel excess heat if not able to be utilized.

If the cogeneration controller or OEE determines the time of day to be for example 1 pm (i.e. off peak), and upon checking its Net Meter Policy it is instructed not to generate electricity, the cogeneration unit may continue to operate its pumps, heat pumps, heat exchangers, air handlers, thermal storage device, depending on the stat of thermal storage to provide heat and hot water to the habitat as required until the thermal storage and/or hot water is depleted.

The On-site Energy Eco-system (OEE) includes an all-in-one touch screen computer in the habitat where the users of the energy can see it readily and have access if they want to. The OEE is powered by the electrical lines in the house and it also uses the electrical lines or other means of communicating for communications between interactive electrical plugs and electrical devices as well as cogeneration unit and/or other generation system on site. The OEE computer will display real time information such as energy consumption, generation, date trends, cost etc. The OEE computer has a database containing information to provide a trend analysis (for example, as a graphical interface) of a user's consumption, for example over the last day, twenty four hours, week, month etc.

The OEE communicates with interactive electrical plugs and micro samples them, for energy consumption and trend analysis through its database system. One example would be if a first plug inside the house has a entertainment system, TV, or the like installed on it or plugged into it and a second plug has a lighting or heating device for space heating. The OEE monitors both individual plugs on for example a millisecond sampling basis to enter into the data base and monitor the energy consumption draw. The OEE computer program may then analyze and model or formulate conclusions about the energy consumption patterns in the habitat so that the OEE would be able to predict consumption and demand based upon usage. The longer the system is running the more data that the OEE computer will collect and be able to then project the houses energy demand from the grid and communicate the projected demand in the proactive manner. Another aspect and benefit of communicating with the different individual interactive electrical plugs is that through micro sampling and trend analysis the OEE program is able to determine if there is an electrical short or malfunction in a certain plug or in the corresponding device. The OEE proactively interacts with the plug or device through the plug. As may be appropriate in the circumstances, the plug or device may be turned off.

In keeping with the object of the present invention to breakdown the conventional silos in a household in terms of individual energy uses and the associated wasted heat or heat loss, other examples of sources of heat which could be reclaimed instead of being lost as waste heat include: grey water, wall insulating material including insulation materials, wall boards, excess heat sent from a solar heater which cannot at times be stored by conventional solar powered heat reservoirs, geo-thermal heat if excess to the needs of the household.

The Synergistic Energy Ecosystem (SEE) according to a further aspect of the present invention comprises several energy ecosystem layers.

The OEE computer may provide real time data on energy usage in the habitat. A user looking at this real time data may then see abnormally high power consumption and locate the source of the high consumption. The user may query the OEE computer and determine which plug, that is, which device is assigned to that plug, and analyze or go around the habitat looking at what devices are consuming power. The OEE computer is able to communicate with other OEE's within its Neighbourhood Energy Eco-System (NEE). Onsite the OEE computer monitors and controls both generation and energy reduction at the site based upon opportunistic either generation or energy reduction models that would also allow that OEE computer to collaborate its efforts and capabilities with other OEE's in the neighbourhood. The OEE's within the neighbourhood are coordinated by the NEE. In one embodiment, a neighbourhood is defined by those OEE's which are directly connected to the local electrical transformer. Thus in that embodiment the transformer is the determining factor governing which OEE's are in a particular NEE's neighbourhood. Each OEE communicates first of all with its corresponding NEE for instructions and so as to collaborate with other neighbourhood OEE energy generation and energy reduction efforts. Cogeneration units are on-site at one or more OEE sites in the neighbourhood, but not exclusively so. Each cogeneration unit generates electricity, heat and hot water on-site for consumption as explained above. Various policies determine when each cogeneration system will generate energy. The policies include recognition of various factors including time of day, season, grid energy costs, kind of energy required at the site, and determine when to push energy through the grid for sale to the utility. Policies in place would be such that if the OEE is generating both heat and electricity on that site and is going to be able to produce excess energy, the OEE may supply the excess energy to the other OEE via its NEE, or sell the excess energy to the power utility via the grid.

Thus each OEE may coordinate with its NEE, and via the NEE to other OEE's in the neighbourhood to provide energy to the neighbourhood. For example, as illustrated diagrammatically in FIG. 2a, if a neighbourhood has six homes two of which have cogeneration units and, all six homes have OEE's, the sizing and the capabilities of the two co-generation units would be such that at full operating capacity, enough electrical energy is produced by the two units to meet the energy demands of the entire neighbourhood, including the four homes that do not have co-generation units. The OEE is able to manage additional or separate types of energy generation systems such as solar, wind, natural gas, etc. Solar and wind electrical generation are merely examples of green energy technologies. Energy generated by green energy technologies the corresponding OEE communicates proactively the on-site generation, or shortfall at that site and at that particular moment to the other OEE's. The NEE may then coordinate amongst the OEE's to moderate or to compensate for either the lack of, or too much, energy being produced by, for example, the solar panels or wind powered electrical generation systems. One of the problems with green energy technologies is that they may not be able to produce energy when it is required, for example during peak demand. Peak demand is generally the period between 6 am and 9 am and between 5 pm and 10 pm. During peak demand is when most utilities are running at capacity. Cogeneration units generate excess energy or are able to moderate their energy output in response to feedback coming from the OEE's in the NEE, and in some situations also from outside the NEE, referred to herein as the community energy eco-system CEE.

The CEE monitors the community as a whole, with multiple NEE's within the CEE, and multiple OEE's within each NEE. By combining and moderating both the output of solar or wind electrical generators, or their lack of output, the NEE's and OEE's moderate any excess or under energy production capacities. The OEE program may interface directly through its screen and graphical interface with the user, but also with the user via other communication systems such as e-mail or text messaging, using for example smart phone devices. Thus for opportune generation or opportune energy reduction, if the utility ever needs excess energy for a particular time, the utility can contact the consumer or the user at the OEE level to request help for either producing energy or reducing energy usage. The OEE program may learn the behaviors of the people that are using the system as well as about the actual on-site habitat. The OEE program builds a database and a profile that will allow the OEE program to be proactive by either ramping up its electrical generation or reducing its energy output. This information will be valuable and beneficial to the local community level, as, upstream, the power utility and managers of the grid may better compensate energy production and generation and distribution. In addition their ability to have information, such as what smart meters are supposed to provide, is valuable to the industry.

The OEE collaboration capabilities are advantageous by collaborating together within the NEE to proactively help prevent the grid from failing and also, in the even of a failure, to be able to sustain the neighbourhood.

The diagrammatic depiction of a neighbourhood energy ecosystem (NEE) in FIG. 2a is intended to be an example only, as the NEE for any particular neighbourhood could be much simpler or much more complex. The premise remains the same however. The NEE acts as a collective and is managed by an NEE processor, which may reside at a particular residence or habitat having an OEE processor. The NEE processing and that habitat's OEE processing may be done within the same processor.

Within the NEE, individual residences or habitats have their own OEE processor. At least one residence or habitat will have an onsite cogeneration unit or system according to the embodiments of FIGS. 1 and 1a, or derivatives or equivalents thereof, of when in use a revolving warming air mass within the open cavity of the enclosure is warmed using waste heat from all components therein giving of waste heat within the system enclosure including generation heat pumps, so that the warm air applies heat to the cold end of the heat pump. This provides for efficient heat pump operation when outside air temperatures are low. Hereinafter the cogeneration unit or cogeneration system its alternatively referred to as a "CS".

Preferably each NEE has more than one CS. Each CS has its own OEE controller, such as controller 40. Residences or habitats within the NEE, but without Cogeneration Systems, are merely energy users and referred to herein as non-CS subscribers. Such non-cogeneration energy users rely on electricity produced by either: (1) the Cogenerations Systems within the NEE; (2) from Cogeneration Systems outside the NEE, but for example within neighbouring neighbourhoods within a community of NEE neighbourhoods forming the CEE (for example, such a community may be an entire municipality, suburb, village, township or even a city); or, (3) the conventional power grid maintained by the Power Utility company.

Within the neighbourhood the NEE processor monitors for time-of-day, charging status of OEE heat batteries, cost of energy from the conventional grid according to time-of-day, season of the year, etc and, knowing the cost of energy from each CS, does a comparison at intervals or substantially continuously to know when to ask the CS's to begin generating electricity for the residences or habitats in the corresponding neighbourhood. Each participating residence or habitat in the neighbourhood has agreed to a preset policy which sets out the protocol for distribution of electricity to accommodate the neighbourhood, that is, to accommodate the subscribing residences or habitants in the neighbourhood. The residences or habitats having CS's supply electricity to their own buildings when the NEE processor or OEE processor indicates it economical to do so. The NEE processor may however call on the CS's to supply electricity to the non-CS subscribers when the CS OEE processors report to the NEE processor that they are generating surplus power above that needed by the CS residence or habitat. The NEE may continuously or at intervals poll the CS OEE processors for this information. The historical data of power availability from the CS OEE will enable the NEE processor to predict availability of power to distribute in the neighbourhood.

The CS OEE processor will report other factors relevant to availability of power to the neighbourhood. For example, if a particular CS has a partly or fully depleted heat battery, that CS OEE processor will signal to the NEE processor that it desires to operate its generator in order to charge its heat battery. Conversely, if a particular CS heat battery is fully charged, the corresponding CS processor will not want to operate its generator, unless it can either obtain a high monetary rate of return for its owner or needs to for example merely heat hot water (if that CS is configured to do so and needs to heat its hot water tank or has in-floor heating and the residence requires heating, etc)

In instances where the CS is not owned by the owner of the corresponding residence or habitat the owner instead for example merely leasing the CS from the owner or operator of the NEE (which may be the Utility company or others), then as part of the terms of the lease that residence OEE processor has no choice but to operate when called upon to do so by the NEE processor. Thus the NEE processor may call on the leased CS's to operate, overriding other factors such as heat battery level, to supply electricity to the neighbourhood during for example peak demand times when power from the grid is uneconomical when compared to the coat of power from the CS's within the NEE.

As seen in the model of FIG. 10, and in round numbers, where each CS can supply approximately 6 KWH per peak demand evening in excess production over its internal needs, that is, the needs of its residence or habitat, and where each non-CS subscriber requires 2 KWH during the same period, then each CS will support three of its neighbours. The NEE processor knows this from its historical data tracking. If a particular non-CS subscriber during a particular peak demand period is demanding more than its usual (say 2 KWH) consumption then the NEE processor may take action from amongst several alternatives, namely: (1) bringing more CS's online to supply more power into the NEE and permit the increased demand of the non-CS subscriber; (2) allow the supply of the power to meet the increased demand so long as, and until, collectively within the NEE all the non-CS subscribers are demanding their historical allotment of power at which time signal to the higher demand non-CS OEE that its demand cannot be met (whereupon, if that residence is so equipped with interactive appliances or interactive electrical outlets, have the NEE processor or OEE processor for that residence shut off power to non-essential appliances or uses, using the OEE display in the residence to first warn the user and to select which power consuming appliance or use to continue without exceeding the allowed maximum power consumption); (3) check that particular non-CS subscriber's subscription plan (in the scenario that different subscription plans are available to the non-CS subscribers) and if that non-CS subscriber's plan allows for excess power usage above a threshold over historical demand for that subscriber then provide the extra power being demanded (for example if that subscriber pays extra for premium non-interrupted power supply service), else send the warning to the OEE display in the residence and, once warned, and if the residence is so equipped, start reducing the power usage by interacting with the interactive appliances and electrical outlets to turn off non-essential power usage, or time shift such usage to off-peak times, or, (4) switch that non-CS subscriber to mains power at the more expensive rate.

Because of energy losses between neighbourhoods, for example, between transformers, each NEE processor will only provide excess power out into the CEE when economical to do so or in the event of an emergency. In the event of failure of the Utility grid power supply, or other emergency pre-set to be acknowledged by each OEE and NEE processor, then distribution of power is coordinated throughout the CEE by its processor, for example overriding the NEE processor's sense of internal priority, while requiring all CS's to operate to the full extent to which they are capable, keeping in mind that depending on the emergency, CS's dependent on for example natural gas to operate may be unable to operate if their supply of natural gas fails. An example might be a power outage combined with, or due to, an earthquake which disrupts natural gas delivery. In areas prone to such emergencies, CS's may be equipped to default to alternative fuels upon CEE or NEE processors alerting OEE processors of an emergency for example.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:
1. A method for cogeneration and distribution of heat and electricity, the method comprising:
   a) Providing a cogeneration system which includes:
      (i) an insulated hollow enclosure, wherein said enclosure is adapted to stand adjacent a habitat requiring space heating and electricity,
      (ii) a fuel-burning electrical generator mounted in said enclosure, a first ambient air intake and corresponding first ambient air intake conduit for communicating ambient air from outside of said enclosure, said first ambient air intake in fluid communication with an air intake on said generator, an exhaust conduit communicating exhaust from said generator to the ambient air outside said enclosure, and wherein said enclosure is sized so as to provide a warm-air space at least above and adjacent to said generator, wherein said generator is adapted to supply supplied electricity to at least said habitat,
      (iii) a second ambient air intake into said enclosure providing ambient air into an airflow flowing in a downstream direction through said enclosure,
      (iv) a fan mounted in said airflow, said fan urging said airflow in said downstream direction and through said warm-air space, a heat pump having a hot and a cold end, said heat pump mounted in said enclosure in said airflow and downstream of said warm-air space and arranged so that when said heating of said habitat is required, pre-warmed air from said warm-air space flows to said cold end of said heat pump and so that air warmed by said generator impinges said cold end of said heat pump and exits said heat pump in said airflow flowing in said downstream direction from said heat pump,
      (v) an airflow redirector mounted at a downstream side of said enclosure, a heat pump conduit mounted to said airflow redirector for communicating said airflow into said habitat when said airflow redirector is in an airflow venting position,
      (vi) a recirculating passageway within said enclosure in fluid communication from a downstream end of said airflow to an upstream end of said airflow, said recirculating passageway extending over said warm-air space, wherein said airflow redirector redirects said airflow into said recirculating passageway when said airflow redirector is in an airflow Begin redirecting position,
      (vii) a thermal battery mounted in said enclosure, at least one heat exchanger capturing heat from said airflow, and said exhaust conduit, and transferring said heat to said thermal battery when said generator is running, and selectively transferring stored said heat from said battery to said airflow when said generator is not running and said heat pump and said fan are running,
      (viii) an onsite energy ecosystem (OEE) controller controlling operation of said generator, said heat pump and said at least one heat exchanger,
   b) operating, during a peak energy demand period, said OEE controller and controlling said cogeneration system so as to generate electricity from said generator:
      (i) to supply said electricity to habitat,
      (ii) once the energy demand of said habitat is met then to supply excess electricity to other habitats having need of electricity from said cogeneration system,
   c) discontinuing operation of said generator during an off-peak energy demand period, unless there has been a power failure wherein mains utility grid power is not available to the habitat, in which case said cogeneration continues as during said peak energy demand period,
   d) using heat from said battery instead of heat from said generator to warm said airflow when operation of said generator is said discontinued,
   further comprising a thermal storage device, wherein said thermal storage device includes an air duct journalled through said battery and wherein said heat pump cold end includes at least one condenser and said at least one condenser is mounted in said air duct, and wherein said fan motivates said airflow to flow over said generator and through said air duct,
   wherein said thermal storage device further includes a water jacket sandwiched between said air duct and said battery.

2. The method of claim 1 wherein said at least one heat exchanger includes an airflow heat exchanger in said airflow downstream of said warm-air space.

3. The method of claim 2 wherein said warm-air space is positioned to maximize capture of heat radiated from said operation of said generator.

4. The method of claim 3 wherein said passageway is positioned over said warm-air space so as to recapture heat from said warm-air space rising from said airflow so as to said impinge said generator.

5. The method of claim 4 wherein said heat pump is positioned above said generator within said enclosure.

6. The method of claim 5 wherein said enclosure has an upper level and a lower lever, and wherein said warm-air space, said airflow heat exchanger and said heat pump are in said upper level and said generator and said battery are in said lower level.

7. The method of claim 6 wherein an airflow mixer and said airflow redirector are in said upper level, and wherein said upper level between said heat pump and said airflow redirector is sealed from said lower level directly therebelow so that said airflow is redirected into said passageway when said airflow redirector is in said redirecting position.

8. The method of claim 7 wherein said enclosure has walls and a ceiling, said passageway is defined by upper walls of said walls and ceiling the of said enclosure.

9. The method of claim 1 wherein said fan is downstream of said cold end of said heat pump.

10. The method of claim 1 wherein said enclosure is mounted to a common side wall with said habitat and includes an access door opening to outside of said habitat.

11. The method of claim 7 wherein said airflow mixer is a mixing valve and said airflow redirector is a redirecting valve.

12. The method of claim 1 wherein said thermal storage device further includes a heat reservoir core surrounding said air.

13. The method of claim 12 wherein said core, said water jacket and said heat battery are all cylindrical and nested one within the other respectively so as to surround said air duct.

14. The method of claim 13 wherein hot exhaust from said generator is directed via a conduit through said core so as to heat said core.

15. The method of claim 14 wherein said at least one heat exchanger includes first and second heat exchangers supplying energy from said airflow to said battery.

16. The method of claim 15 wherein said water jacket supplies hot water for use in said habitat.

17. The method of claim 1 including providing an airflow mixer mounted in said enclosure, downstream of said second ambient air intake, and in an upstream position relative to said warm-air space, said second ambient air intake for communicating ambient air from the outside of said enclosure to said airflow mixer, said airflow mixer directing said airflow in said downstream direction from said airflow mixer so as to flow in said downstream direction through said warm-air space, and wherein said airflow mixer receives recirculated said airflow from said passageway and mixes it with the ambient air from said second ambient air intake in proportions according to instructions from said OEE controller, and optimizing efficiency of said heat pump by stabilizing a cold end temperature at said cold end of said heat pump within a predetermined optimal range of temperatures by operation of said controller to control said airflow mixer, and wherein:
  a) when said generator is running and said habitat is to be heated
    (i) electricity is supplied from said generator to said habitat if needed by said habitat, and excess electricity from said generator supplied to said other habitats or sold to a Utility,
    (ii) when said ambient temperature is above a predetermined low temperature, said mixer provides all of said airflow from the ambient air and said airflow redirector vents all of said airflow to the ambient air outside said enclosure,
    (iii) when said ambient temperature is below said predetermined low temperature, said airflow mixer progressively, as said ambient temperature drops, provides an increasing amount of said redirected airflow from said passageway and said airflow redirector correspondingly progressively closes to said redirecting position from said venting position, and said fan urges said airflow into and along said passageway,
    (iv) said at least one heat exchanger stores heat into the group comprising: said thermal battery, a hot water reservoir,
  b) when said generator is not running and said habitat is to be heated:
    (i) said at least one heat exchanger extracts heat from said group comprising: said thermal battery, said hot water reservoir, and uses said extracted heat to warm said airflow,
    (ii) said airflow mixer supplies said airflow into said warm-air space from substantially entirely said passageway and said airflow redirector is in said redirecting position wherein said airflow is recirculated via said passageway.

18. A system for cogeneration and distribution of heat and electricity comprising:
  (i) an insulated Begin hollow enclosure, wherein said enclosure is adapted to stand adjacent a habitat requiring space heating and electricity,
  (ii) a fuel-burning electrical generator mounted in said enclosure, a first ambient air intake and corresponding first ambient air intake conduit for communicating ambient air from outside of said enclosure, said first ambient air intake in fluid communication with an air intake on said generator, an exhaust conduit communicating exhaust from said generator to the ambient air outside said enclosure, and wherein said enclosure is sized so as to provide a warm-air space at least above and adjacent to said generator, wherein said generator is adapted to supply supplied electricity to at least said habitat,
  (iii) a second ambient air intake into said enclosure providing ambient air into an airflow flowing in a downstream direction through said enclosure,
  (iv) a fan mounted in said airflow, said fan urging said airflow in said downstream direction and through said warm-air space, a heat pump having a hot and a cold end, said heat pump mounted in said enclosure in said airflow and downstream of said warm-air space and arranged so that when said heating of said habitat is required, pre-warmed air from said warm-air space flows to said cold end of said heat pump and so that air warmed by said generator impinges said cold end of said heat pump and exits said heat pump in said airflow flowing in said downstream direction from said heat pump,
  (v) an airflow redirector mounted at a downstream side of said enclosure, a heat pump conduit mounted to said airflow redirector for communicating said airflow into said habitat when said airflow redirector is in an airflow venting position, (vi) a recirculating passageway within said enclosure in fluid communication from a downstream end of said airflow to an upstream end of said airflow, said recirculating passageway extending over said warm-air space, wherein said airflow redirector redirects said airflow into said recirculating passageway when said airflow redirector is in an airflow redirect position, (vii) a thermal battery mounted in said enclosure, at least one heat exchanger capturing heat from said airflow, and said exhaust conduit, and transferring said heat to said thermal battery when said generator is running, and selectively transferring stored said heat from said battery to said airflow when said generator is not running and said heat pump and said fan are running, (viii) an onsite energy ecosystem (OEE) controller controlling operation of said generator, said heat pump and said at least one heat exchanger, wherein said OEE controller is adapted to: operate during a peak energy demand period to control said cogeneration system so as to generate electricity from said generator:

(i) to supply said electricity to habitat, (ii) once the energy demand of said habitat is met then to supply excess electricity to other habitats having need of electricity from said cogeneration system, and to discontinue operation of said generator during an off-peak energy demand period, unless there has been a power failure wherein mains utility grid power is not available to the habitat, in which case said cogeneration continues as during said peak energy demand period, and wherein said system is adapted to use heat from said battery instead of heat from said generator to warm said airflow when operation of said generator is said discontinued, further comprising a thermal storage device mounted downstream of said generator, wherein said thermal storage device includes an air duct journalled through said battery and wherein said heat pump cold end includes at least one condenser and said at least one condenser is mounted in said air duct, and wherein said fan motivates said airflow to flow through said air duct, wherein said thermal storage device further includes a water jacket between said air duct and said battery.

19. The system of claim 18 wherein said at least one heat exchanger includes an airflow heat exchanger in said airflow downstream of said warm-air space.

20. The system of claim 19 wherein said warm-air space is positioned to maximize capture of heat radiated from said operation of said generator.

21. The system of claim 20 wherein said passageway is positioned over said warm-air space so as to recapture heat from said warm-air space rising from said airflow so as to impinge said generator.

22. The system of claim 21 wherein said heat pump is positioned above said generator within said enclosure.

23. The system of claim 22 wherein said enclosure has an upper level and a lower lever, and wherein said warm-air space, said airflow heat exchanger and said heat pump are in said upper level and said generator and said battery are in said lower level.

24. The system of claim 23 wherein an airflow mixer and said airflow redirector are in said upper level, and wherein said upper level between said heat pump and said airflow redirector is sealed from said lower level directly therebelow so that said airflow is redirected into said passageway when said airflow redirector is in said redirecting position.

25. The system of claim 24 wherein said enclosure has walls and a ceiling, said passageway is defined by upper walls of said walls and the ceiling of said enclosure.

26. The system of claim 25 wherein said fan is downstream of said cold end of said heat pump.

27. The system of claim 18 wherein said enclosure is mountable to a common side wall with said habitat and said enclosure includes an access door opening to outside of said habitat.

28. The system of claim 27 wherein said airflow mixer is a mixing valve and said airflow redirector is a redirecting valve.

29. The system of claim 18 wherein said thermal storage device further includes a heat reservoir core surrounding said air duct.

30. The system of claim 29 wherein said core, said water jacket and said heat battery are all cylindrical and nested one within the other respectively so as to surround said air duct.

31. The system of claim 30 wherein said at least one heat exchanger includes first and second heat exchangers supplying energy from said airflow to said heat battery.

32. The system of claim 30 wherein hot exhaust from said generator is directed via a conduit through said core so as to heat said core.

33. The system of claim 18 including an airflow mixer mounted in said enclosure, downstream of said second ambient air intake, and in an upstream position relative to said warm-air space, a second ambient air intake for communicating ambient air from the outside of said enclosure to said airflow mixer, said airflow mixer adapted to direct an airflow in a downstream direction from said airflow mixer so as to flow in said downstream direction through said warm-air space, and wherein said airflow mixer is positioned to receive recirculated said airflow from said passageway and to mix it with the ambient air from said second ambient air intake in proportions according to instructions from said OEE controller, and so as to optimize efficiency of said heat pump by stabilizing a cold end temperature at said cold end of said heat pump within a predetermined optimal range of temperatures by operation of said controller to control said airflow mixer, and wherein said controller adapted to:

a) when said generator is running and said habitat is to be heated (i) electricity is supplied from said generator to said habitat if needed by said habitat, and excess electricity from said generator supplied to said other habitats or sold to a Utility, (ii) when said ambient temperature is above a predetermined low temperature, said mixer provides all of said airflow from the ambient air and said airflow redirector vents all of said airflow to the ambient air outside said enclosure, (iii) when said ambient temperature is below said predetermined low temperature, said airflow mixer progressively, as said ambient temperature drops, provides an increasing amount of said redirected airflow from said passageway and said airflow redirector correspondingly progressively closes to said redirecting position from said venting position, and said fan urges said airflow into and along said passageway, (iv) said at least one heat exchanger stores heat into said thermal battery, b) when said generator is not running and said habitat is to be heated:

(i) said at least one heat exchanger extracts heat from said thermal battery and warms said airflow,
(ii) said airflow mixer supplies said airflow into said warm-air space from substantially entirely said passageway and said airflow redirector is in said redirecting position wherein substantially all of said airflow is recirculated via said passageway.

* * * * *